(12) United States Patent
Li et al.

(10) Patent No.: US 12,184,864 B2
(45) Date of Patent: Dec. 31, 2024

(54) INTELLIGENT COMPUTING RESOURCES ALLOCATION FOR FEATURE NETWORK BASED ON FEATURE PROPAGATION

(71) Applicant: ALIBABA GROUP HOLDING LIMITED, Grand Cayman (KY)

(72) Inventors: Sicheng Li, San Mateo, CA (US);
Yuanwei Fang, San Mateo, CA (US);
Minghai Qin, San Mateo, CA (US);
Yen-kuang Chen, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 134 days.

(21) Appl. No.: 17/038,719

(22) Filed: Sep. 30, 2020

(65) Prior Publication Data
US 2022/0103831 A1  Mar. 31, 2022

(51) Int. Cl.
| | |
|---|---|
| *H04N 19/139* | (2014.01) |
| *G06F 18/213* | (2023.01) |
| *G06V 10/94* | (2022.01) |
| *H04N 19/105* | (2014.01) |
| *H04N 19/172* | (2014.01) |

(52) U.S. Cl.
CPC ......... *H04N 19/139* (2014.11); *G06F 18/213* (2023.01); *G06V 10/94* (2022.01); *H04N 19/105* (2014.11); *H04N 19/172* (2014.11)

(58) Field of Classification Search
CPC .. H04N 19/105; H04N 19/139; H04N 19/172; H04N 19/436; G06K 9/6232
See application file for complete search history.

(56) References Cited

U.S. PATENT DOCUMENTS

| | | | | |
|---|---|---|---|---|
| 8,194,175 | B2* | 6/2012 | Kimoto | G02B 7/36 |
| | | | | 348/353 |
| 2006/0215754 | A1* | 9/2006 | Buxton | H04N 19/436 |
| | | | | 375/E7.103 |
| 2007/0276954 | A1* | 11/2007 | Chan | H04N 21/23406 |
| | | | | 375/E7.025 |
| 2008/0107184 | A1* | 5/2008 | Katsavounidis | H04N 19/577 |
| | | | | 375/E7.267 |
| 2009/0324108 | A1* | 12/2009 | Yan | H04N 19/436 |
| | | | | 382/232 |
| 2013/0177203 | A1* | 7/2013 | Koo | G06V 20/20 |
| | | | | 382/103 |
| 2014/0334545 | A1* | 11/2014 | Schmit | H04N 19/15 |
| | | | | 375/240.15 |
| 2016/0191935 | A1* | 6/2016 | Chao | G06F 5/065 |
| | | | | 375/240.25 |
| 2016/0219285 | A1* | 7/2016 | Kim | H04N 19/593 |
| 2017/0180730 | A1* | 6/2017 | Yatabe | H04N 19/61 |
| 2017/0201756 | A1* | 7/2017 | Chen | H04N 19/436 |

(Continued)

*Primary Examiner* — Jeremiah C Hallenbeck-Huber
(74) *Attorney, Agent, or Firm* — Finnegan, Henderson, Farabow. Garrett & Dunner, LLP

(57) ABSTRACT

The present disclosure relates to a method for scheduling computation resources for generating feature maps for video. The method comprises determining runtime for generating feature maps of a reference picture and a predicted picture, determining available computation resources for generating the feature maps, and allocating, based on the runtime, one or more computation resources among the available computation resources for generating the feature maps such that the feature maps are generated at regular time intervals.

19 Claims, 12 Drawing Sheets

(56) References Cited

U.S. PATENT DOCUMENTS

| | | | | |
|---|---|---|---|---|
| 2017/0310983 | A1* | 10/2017 | Gudumasu | H04N 19/127 |
| 2018/0284733 | A1* | 10/2018 | Ueyama | G05B 19/0428 |
| 2019/0132591 | A1* | 5/2019 | Zhang | H04N 19/59 |
| 2020/0143457 | A1* | 5/2020 | Manmatha | G06F 3/04812 |
| 2020/0160546 | A1* | 5/2020 | Gu | G06N 3/08 |
| 2020/0218929 | A1* | 7/2020 | Li | G06F 18/00 |
| 2020/0298891 | A1* | 9/2020 | Liang | G05D 1/0088 |
| 2020/0304825 | A1* | 9/2020 | Ardö | H04N 19/167 |
| 2020/0342258 | A1* | 10/2020 | Uno | G06V 10/82 |
| 2020/0374534 | A1* | 11/2020 | Chen | H04N 19/176 |
| 2021/0160522 | A1* | 5/2021 | Lee | H04N 19/119 |
| 2022/0189170 | A1* | 6/2022 | Zhu | G06V 10/776 |

* cited by examiner

INTELLIGENT COMPUTING RESOURCES ALLOCATION FOR FEATURE NETWORK BASED ON FEATURE PROPAGATION

BACKGROUND

Machine learning or deep learning has been widely used in various areas. Convolutional neural network (CNN) is one type of a neural network widely applied on machine learning or deep learning. CNNs are used in a variety of applications including image processing, speech recognition, game play, robotics, etc. CNNs have been widely used in solving many image or video analysis issues, such as object classification, image segmentation, etc. There is an increasing demand for real time video processing, e.g., for autonomous driving, video surveillance, online gaming, conferencing, live broadcasting, etc. Improving quality of service (QoS) of live video provision based on real-time image processing is important while improving efficiency of processing images or videos.

SUMMARY OF THE DISCLOSURE

Embodiments of the present disclosure provide a method for scheduling computation resources for generating feature maps for video. The method comprises determining runtime for generating feature maps of a reference picture and a predicted picture, determining available computation resources for generating the feature maps, and allocating, based on the runtime, one or more computation resources among the available computation resources for generating the feature maps such that the feature maps are generated at regular time intervals.

Embodiments of the present disclosure provide an apparatus for scheduling computation resources for generating feature maps for video. The apparatus comprises at least one processor configured to execute a set of instructions to cause the apparatus to perform: determining runtime for generating feature maps of a reference picture and a predicted picture, determining available computation resources for generating the feature maps, and allocating, based on the runtime, one or more computation resources among the available computation resources for generating the feature maps such that the feature maps are generated at regular time intervals.

Embodiments of the present disclosure also provide a non-transitory computer readable medium that stores a set of instructions that is executable by at least one processor of a computing device to perform a method for scheduling computation resources for generating feature maps for video. The method comprises determining runtime for generating feature maps of a reference picture and a predicted picture, determining available computation resources for generating the feature maps, and allocating, based on the runtime, one or more computation resources among the available computation resources for generating the feature maps such that the feature maps are generated at regular time intervals.

Embodiments of the present disclosure also provide a terminal comprising an accelerator comprising computation resources and an apparatus for scheduling the computation resources for generating feature maps for video. The apparatus comprises at least one processor configured to execute a set of instructions to cause the apparatus to perform: determining runtime for generating feature maps of a reference picture and a predicted picture, determining available computation resources for generating the feature maps, and allocating, based on the runtime, one or more computation resources among the available computation resources for generating the feature maps such that the feature maps are generated at regular time intervals.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

Embodiments and various aspects of present disclosure are illustrated in the following detailed description and the accompanying figures. Various features shown in the figures are not drawn to scale.

DETAILED DESCRIPTION

Figure 1:
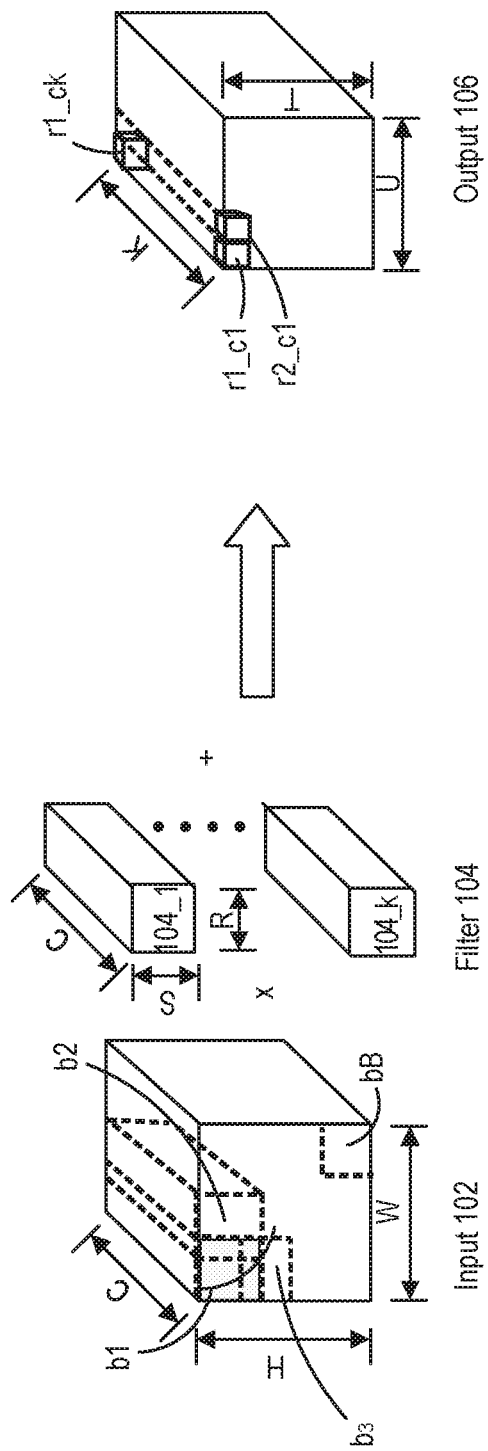
FIG. 1 illustrates an exemplary convolution operation on a convolutional neural network (CNN).

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Convolutional neural network (CNN) is one type of a neural network widely applied on machine learning or deep learning. CNNs have been widely used in solving many image or video analysis issues, such as object classification, image segmentation, etc. Video data is typically decompressed into multiple frames, and each frame is fed to a CNN-based network for processing. However, this procedure is time and resource consuming in two aspects: 1) Decompression of video data into multiple frames may be a bottleneck in processing the video data; and 2) Because each frame comprises a substantial amount of data and a feature extraction process from frames is compute-intensive, feature extraction from frames can take considerable time and resources of neural network accelerators. An efficient video processing technique based on feature propagation can be employed such that a full feature extraction network is used only for generating feature maps of reference frames (I-pictures) and a lighter network is used for generating feature maps of predicted frames (P-pictures) based on feature propagation scheme. While feature propagation scheme can considerably reduce an amount of computation, it causes imbalance in computation time between for generating a reference feature map and for generating a predicted feature map. Such imbalance inference time is not desirable for processing video data in real time for providing a real-time video service, e.g., for autonomous driving, video surveillance, online gaming, conferencing, live broadcasting, etc.

According to some embodiments of the present disclosure, an intelligent computing resources allocation scheme can be provided for feature networks for extracting feature maps of a video. According to some embodiments of the present disclosure, quality of service (QoS) of live video services can be improved while improving efficiency of processing videos based on feature propagation. According to some embodiments of the present disclosure, quality of service (QoS) of live video services can be improved by reducing motion artifacts. According to some embodiments of the present disclosure, various live video applications can be provided by employing various task networks depending on applications. According to some embodiments of the present disclosure, feature maps comprising a reference feature map and a predicted feature map can be generated at regular time intervals.

FIG. 1 illustrates an exemplary convolution operation on a convolutional neural network (CNN). In this exemplary operation, input data 102 (such as activations) is structured as a number (e.g., C) of channels, each of which is a two-dimensional (2D) layer. As shown in FIG. 1, input data 102 (e.g., an image) has C number of channels, and one channel of input data 102 has a size of H×W. Therefore, the size of the input data 102 can be H×W×C.

In FIG. 1, input data 102 can be convolved with a filter 104. Different channels of input data 102 may have different parameters such as weights, bias terms, etc. while one channel can share the same parameters. Therefore, each filter 104 can have C number of channels corresponding to C number of channels of input data 102. Each channel of filter 104 can slide over a corresponding channel of input data 102. As shown in FIG. 1, each channel of filter 104 has a size S×R, and the size of one filter 104 can be S×R×C. Here, window sliding over input data 102 for a convolution operation can have the size S×R. In this example, input data 102 is convolved with K number of filters 104_1 to 104_k.

When a first channel of a first filter 104_1 slides on a first channel of input data 102 for a convolution operation, the first channel of first filter 104_1 is multiplied to receptive fields such as $b_1$ to $b_3$ in the first channel of input data 102. Receptive fields $b_1$ to $b_3$ can be defined to partially overlap with adjacent receptive fields. For example, first receptive field $b_1$ partially overlaps with second receptive field $b_2$ and third receptive field $b_3$ as shown in FIG. 1. Receptive fields for the rest of channels of input data 102 can be defined corresponding to receptive fields of the first channel. Therefore, each of first receptive field $b_1$ to third receptive field $b_3$ has C number of channels. When each channel of input data 102 has B number of receptive fields, it can be considered that, in the present disclosure, the input data 102 comprises B number of work items each of which includes C number of channels for illustration purposes. Here, C channels of each work item can have a size corresponding to a size S×R of the receptive field.

One output value can be generated by multiplying first filter 104_1 with first receptive field $b_1$ of input data 102 and by summing multiplication results for C number of channels. For example, first output value $r_1\_c_1$ can be generated by multiplying each channel of first filter 104_1 and corresponding channel in the first receptive field $b_1$ of input data 102 and by summing multiplication results from C number of channels. By multiplying first filter 104_1 and second receptive field $b_2$ of input data 102 channel by channel and by summing multiplication results for C number of channels, second output value $r_2\_c_1$ can be generated. B number of output values including first output value $r_1\_c_1$ and second output value $r_1\_c_2$ generated by sliding first filter 104_1 over input data 102 can constitute a first channel of output data 106.

Similarly, B number of output values can be generated by convolving second filter 104_2 on input data 102 and can constitute a second channel of output data 106. B number of output values can also be generated by convolving $K^{th}$ filter 104_k on input data 102 and can constitute a $K^{th}$ channel of output data 106. For example, first output value $r_1\_c_k$ on the $K^{th}$ channel can be generated by multiplying each channel of $K^{th}$ filter 104_1 and corresponding channel in the first receptive field $b_1$ of input data 102 and by summing multiplication results for C number of channels. As shown in FIG. 1, output data 106 can have K number of channels corresponding to the number of filters 104 and each channel has a size of T×U. Therefore, the size of the output data 106 can be T×U×K. In this example, T×U can be equal to the number of work items of input data 102, i.e., B. In some embodiments, output data 106 can be intermediate output data of a convolutional operation. In some embodiments, output data 106 can be further processed by other operations including element-wise operations to generate final output data for the convolutional operation. In some embodiments, when input data 102 is image data, output data 106 can be a feature map and the feature map can have K number of channels.

Figure 2A:
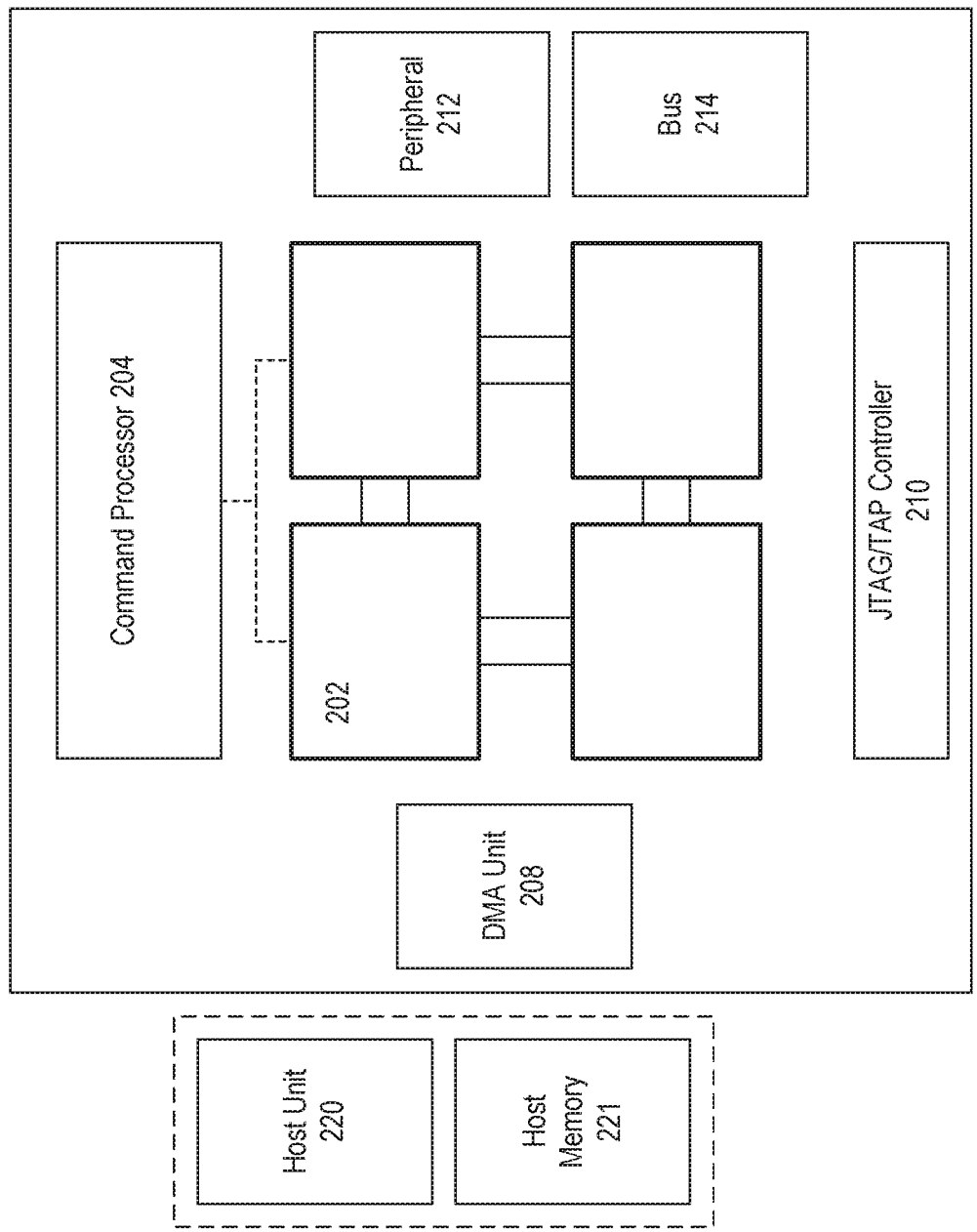
FIG. 2A illustrates an exemplary neural network accelerator architecture, consistent with some embodiments of the present disclosure.

FIG. 2A illustrates an exemplary neural network accelerator architecture, consistent with some embodiments of the present disclosure. In the context of this disclosure, a neural network accelerator may also be referred to as a machine learning accelerator or deep learning accelerator. In some embodiments, accelerator 200 may be referred to as a neural network processing unit (NPU) 200. As shown in FIG. 2A, accelerator 200 can include a plurality of cores 202, a command processor 204, a direct memory access (DMA) unit 208, a Joint Test Action Group (JTAG)/Test Access End (TAP) controller 210, a peripheral interface 212, a bus 214, and the like.

It is appreciated that, cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. To perform the operation on the communicated data packets, cores 202 can include one or more processing elements for processing information in the data packets. Each processing element may comprise any number of processing units. According to some embodiments of the present disclosure, accelerator 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail with respect to FIG. 2B.

Command processor 204 can interact with a host unit 220 and pass pertinent commands and data to corresponding core 202. In some embodiments, command processor 204 can interact with host unit 220 under the supervision of kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate one or more cores 202 for parallel execution.

DMA unit 208 can assist with transferring data between host memory 221 and accelerator 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator 200. For example, DMA unit 208 can assist with transferring data between multiple cores 202 or within each core. Thus, DMA unit 208 can also generate memory addresses and initiate memory read or write cycles. DMA unit 208 can also contain several hardware registers that can be written and read by the one or more processors, including a memory address register, a byte-count register, one or more control registers, and other types of registers. These registers can specify some combination of the source, the destination, the direction of transfer (reading from the input/output (I/O) device or writing to the I/O device), the size of the transfer unit, or the number of bytes to transfer in one burst. It is appreciated that accelerator 200 can include a second DMA unit, which can be used to transfer data between other accelerator architectures to allow multiple accelerator architectures to communicate directly without involving the host CPU.

JTAG/TAP controller 210 can specify a dedicated debug port implementing a serial communications interface (e.g., a JTAG interface) for low-overhead access to the accelerator without requiring direct external access to the system address and data buses. JTAG/TAP controller 210 can also have on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between the accelerator and other devices.

Bus 214 (such as a $I^2C$ bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the accelerator with other devices, such as the off-chip memory or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it could still be concerned with specialized inter-bus communications.

Accelerator 200 can also communicate with host unit 220. Host unit 220 can be one or more processing unit (e.g., an X86 central processing unit). As shown in FIG. 2A, host unit 220 may be associated with host memory 221. In some embodiments, host memory 221 may be an integral memory or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to the on-chip memory integrated within accelerator chip, acting as a higher-level cache. The data stored in host memory 221 may be transferred to accelerator 200 to be used for executing neural network models.

In some embodiments, a host system having host unit 220 and host memory 221 can comprise a compiler (not shown). The compiler is a program or computer software that transforms computer codes written in one programming language into instructions for accelerator 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system including the compiler may push one or more commands to accelerator 200. As discussed above, these commands can be further processed by command processor 204 of accelerator 200, temporarily stored in an instruction buffer of accelerator 200, and distributed to corresponding one or more cores (e.g., cores 202 in FIG. 2A) or processing elements. Some of the commands may instruct a DMA unit (e.g., DMA unit 208 of FIG. 2A) to load instructions and data from host memory (e.g., host memory 221 of FIG. 2A) into accelerator 200. The loaded instructions may then be distributed to each core (e.g., core 202 of FIG. 2A) assigned with the corresponding task, and the one or more cores may process these instructions.

Figure 2B:
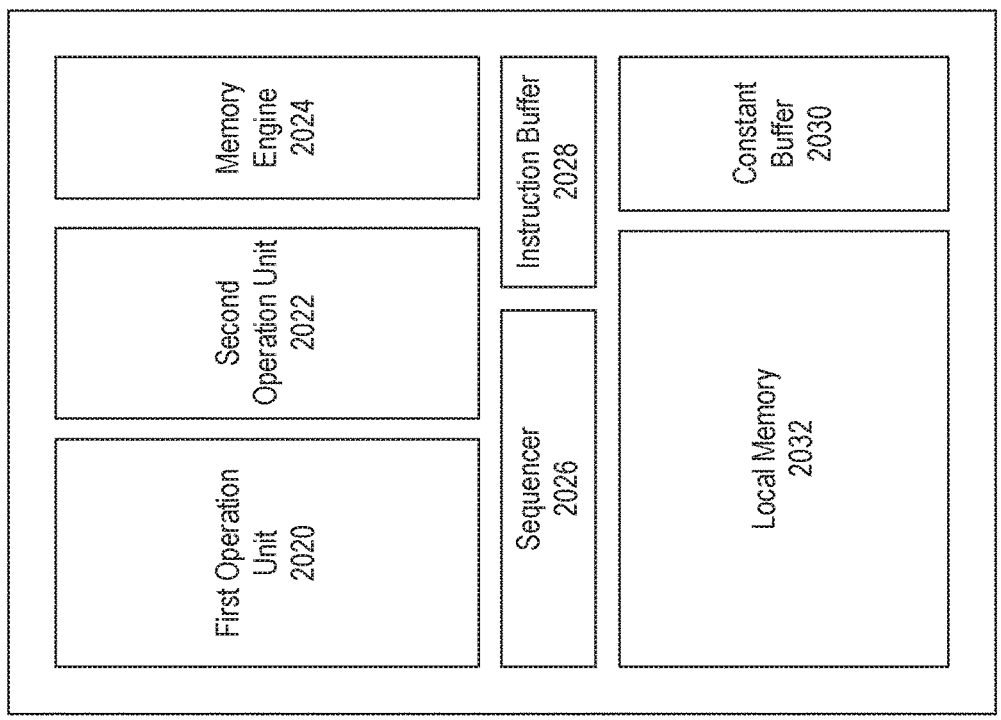
FIG. 2B illustrates an exemplary neural network accelerator core architecture, consistent with some embodiments of the present disclosure.

It is appreciated that the first few instructions received by the cores 202 may instruct the cores 202 to load/store data from host memory 221 into one or more local memories of the cores (e.g., local memory 2032 of FIG. 2B). Each core 202 may then initiate the instruction pipeline, which involves fetching the instruction (e.g., via a sequencer) from the instruction buffer, decoding the instruction (e.g., via a DMA unit 208 of FIG. 2A), generating local memory addresses (e.g., corresponding to an operand), reading the source data, executing or loading/storing operations, and then writing back results.

According to some embodiments, accelerator 200 can further include a global memory (not shown) having memory blocks (e.g., 4 blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator 200 can further include memory controller (not shown) configured to manage reading and writing of data to and from a specific memory block (e.g., HBM2) within global memory. For example, memory controller can manage read/write data coming from core of another accelerator (e.g., from DMA unit 208 or a DMA unit corresponding to another accelerator) or from core 202 (e.g., from a local memory in core 202). It is appreciated that more than one memory controller can be provided in accelerator 200. For example, there can be one memory controller for each memory block (e.g., HBM2) within global memory.

Memory controller can generate memory addresses and initiate memory read or write cycles. Memory controller can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers.

While accelerator 200 of FIG. 2A can be used for convolutional neural networks (CNNs) in some embodiments of the present disclosure, it is appreciated that accelerator 200 of FIG. 2A can be utilized in various neural networks, such as deep neural networks (DNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like.

FIG. 2B illustrates an exemplary core architecture, consistent with embodiments of the present disclosure. As shown in FIG. 2B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations. An example of first operation unit 2020 will be explained with respect to FIG. 3 in detail.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copy from a local memory (e.g., local memory 2032 of FIG. 2B) into a corresponding operation unit. Memory engine 2024 can also be configured to perform matrix transposition to make the matrix suitable to be used in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to the sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With the massive storage space, most of data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or above. According to some embodiments of the present disclosure, local memory 2032 be evenly distributed on chip to relieve dense wiring and heating issues.

Figure 2C:
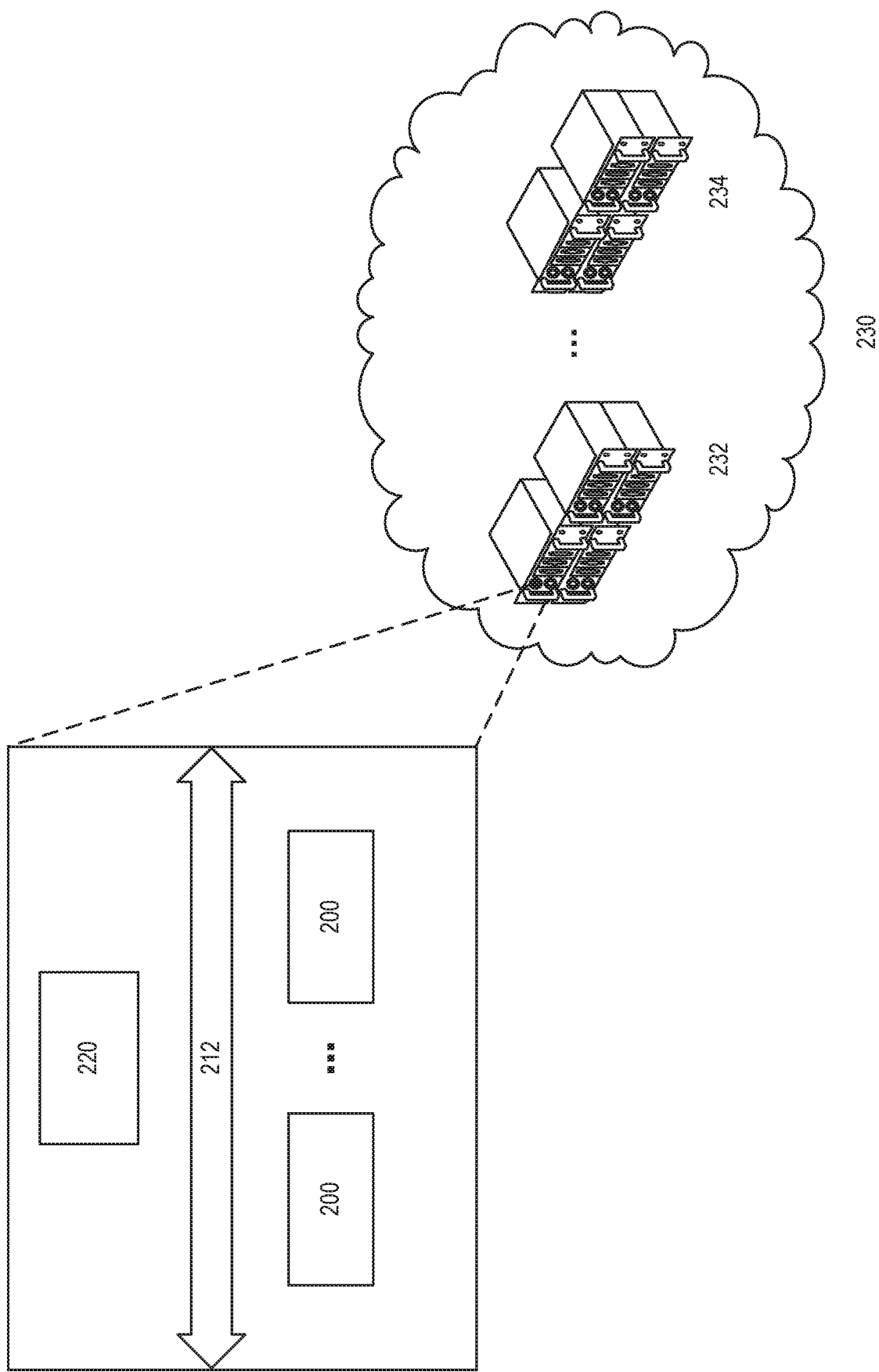
FIG. 2C illustrates a schematic diagram of an exemplary cloud system incorporating a neural network accelerator, consistent with some embodiments of the present disclosure.

FIG. 2C illustrates a schematic diagram of an exemplary cloud system incorporating accelerator 200, consistent with embodiments of the present disclosure. As shown in FIG. 2C, cloud system 230 can provide a cloud service with artificial intelligence (AI) capabilities and can include a plurality of computing servers (e.g., computing servers 232 and 234). In some embodiments, a computing server 232 can, for example, incorporate a neural network accelerator 200 of FIG. 2A. Neural network accelerator 200 is shown in FIG. 2C in a simplified manner for simplicity and clarity.

With the assistance of neural network accelerator 200, cloud system 230 can provide the extended AI capabilities of image recognition, facial recognition, translations, 3D modeling, and the like. It is appreciated that, neural network accelerator 200 can be deployed to computing devices in other forms. For example, neural network accelerator 200 can also be integrated in a computing device, such as a smart phone, a tablet, and a wearable device.

Figure 3:
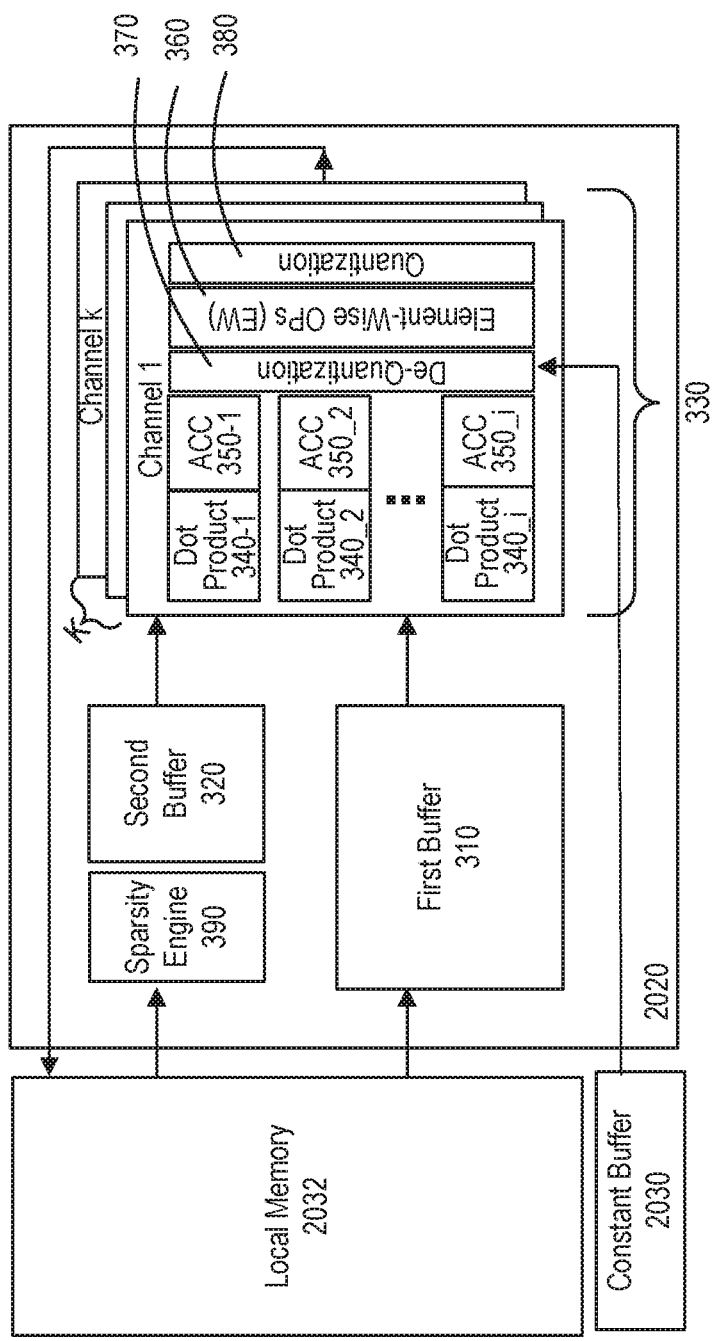
FIG. 3 illustrates an exemplary operation unit configuration, consistent with some embodiments of the present disclosure.

FIG. 3 illustrates an exemplary operation unit configuration, consistent with some embodiments of the present disclosure. According to some embodiments of the present disclosure, an operation unit can be first operation unit 2020 in FIG. 2B. Operation unit 2020 may include a first buffer 310, a second buffer 320, and a processing array 330.

First buffer 310 may be configured to store input data (e.g., input data 102 in FIG. 1). In some embodiments, data stored in first buffer 310 can be input data to be used in processing array 330 for execution. In some embodiments, the input data can be fetched from local memory (e.g., local memory 2032 in FIG. 2B). First buffer 310 may be configured to support reuse or share of data to be used in processing array 330. In some embodiments, input data stored in first buffer 310 may be activation data for a convolution operation.

Second buffer 320 may be configured to store weight data (e.g., weight data 104 in FIG. 1). In some embodiments, weight data stored in second buffer 320 can be used in processing array 330 for execution. In some embodiments, the weight data stored in second buffer 320 can be fetched from local memory (e.g., local memory 2032 in FIG. 2B). In some embodiments, weight data stored in second buffer 320 may be filter data (e.g., filter 104 in FIG. 1) for a convolution operation. According to some embodiments of the present disclosure, weight data stored in second buffer 320 can be compressed data. For example, weight data can be pruned data to save memory space on chip. In some embodiments, operation unit 2020 can further include a sparsity engine 390. Sparsity engine 390 can be configured to unzip compressed weight data to be used in processing array 330.

Processing array 330 may have a plurality of layers (e.g., corresponding to K number of filters 104 in FIG. 1). According to some embodiments of the present disclosure, each layer of processing array 330 may include a plurality of processing strings, which may perform computations in parallel. For example, first processing string included in the first layer of processing array 330 can comprise a first multiplier 340_1 and a first accumulator 350_1 and second processing string can comprise a second multiplier 340_2 and a second accumulator 350_2. Similarly, $i^{th}$ processing string in the first layer can comprise an $i^{th}$ multiplier 340_i and an $i^{th}$ accumulator 350_i. While computations performed by processing array 330 will be explained with respect to operations of FIG. 1 as an example for illustration purpose, it will be appreciated that the present disclosure will not be limited to the example illustrated in FIG. 1.

In some embodiments, multiplier 340 can be configured to perform multiplication operations for an assigned work item. For example, first multiplier 340_1 in a first layer can perform multiplication operations between first receptive field $b_1$ and first filter 104_1 and second multiplier 340_2 in the first layer can perform multiplication operations between second receptive field $b_2$ and first filter 104_1. Similarly, $i^{th}$ multiplier 340_i in the first layer can perform multiplication operations between $i^{th}$ receptive field $b_i$ and first filter 104_1.

Accumulator 350 can perform summation operations of multiplication results from multiplier 340 preceding the accumulator 350 in the same processing string. For example, first accumulator 350_1 in the first layer can perform summation operations of multiplication results from first multiplier 340_1 and produce first output value $r_1\_c_1$. Second accumulator 350_2 in the first layer can perform summation operations of multiplication results from second multiplier 340_2 and produce second output value $r_2\_c_1$. Similarly, $i^{th}$ accumulator 350_i in the first layer can perform summation operations of multiplication results from $i^{th}$ multiplier 340_i and produce $i^{th}$ output value $r_1\_c_1$.

According to some embodiments of the present disclosure, the other layers of processing array 330 can be similarly configured to perform functions similar to the first layer of processing array 330. A second layer of processing array 330 can also have a plurality of processing strings, each of which includes multiplier 340 and accumulator 350. In some embodiments, processing strings in the second layer of processing array 330 can perform multiplication operations and summation operations with respect to the receptive fields $b_1$ to $b_i$ and second filter 104_2. For example, $i^{th}$ multiplier 340_i of $i^{th}$ processing string in the second layer can be configured to perform multiplication operations between $i^{th}$ receptive field $b_i$ and second filter 104_2. $i^{th}$ accumulator 350_i of $i^{th}$ processing string in the second layer can be configured to perform summation operations of multiplication results from $i^{th}$ multiplier 340_i of $i^{th}$ processing string in the second layer and produce output result value $r_i\_c_2$. Similarly, processing strings in the $K^{th}$ layer of processing array 330 can perform multiplication operations and summation operations with respect to the receptive fields $b_1$ to $b_i$ and $K^{th}$ filter 104_k. For example, $i^{th}$ multiplier 340_i of $i^{th}$ processing string in the $K^{th}$ layer can be configured to perform multiplication operations between $i^{th}$ receptive field $b_i$ and $K^{th}$ filter 104_k. $i^{th}$ accumulator 350_i of $i^{th}$ processing string in the $K^{th}$ layer can be configured to perform summation operations of multiplication results from $i^{th}$ multiplier 340_i of $i^{th}$ processing string in the $K^{th}$ layer and produce output result value $r_1\_c_k$.

In some embodiments, processing array 330 can perform computations under SIMD control. For example, when performing a convolution operation (e.g., illustrated in FIG. 1), each layer of processing array 330 can execute same instructions with different data. In the example illustrated in FIG. 1, a first layer of processing array 330 can receive input data corresponding to receptive fields $b_1$ to $b_i$ from first buffer 310 and weight data corresponding to first filter 104_1 from second buffer 320 and perform multiplication and summation computations. A second layer of processing array 330 can receive input data corresponding to receptive fields $b_1$ to $b_i$ and weight data corresponding to second filter 104_2 and perform multiplication and summation computations. Similarly, $K^{th}$ layer of processing array 330 can receive input data corresponding to receptive fields $b_1$ to $b_i$ and weight data corresponding to $K^{th}$ filter 104_k and perform multiplication and summation computations. In this example, each layer of processing array 330 can execute same instructions corresponding to multiplication operations and summation operations with same activation data such as receptive fields $b_1$ to $b_i$ and different weight data such as first filter 104_1 to $K^{th}$ filter 104_k. In some embodiments, K×i number of processing strings are under SIMD control and K×i output values can be generated in parallel.

According to some embodiments of the present disclosure, processing array 330 shown in FIG. 3 can be included in a core (e.g., core 202 in FIG. 2A and FIG. 2B). When a number of processing strings (e.g., i number of processing strings) included in one layer of processing array 330 is smaller than a number of work items (e.g., B number of work items in FIG. 1), i number of work items can be executed by processing array 330 and subsequently the rest of work items (B−i number of work items) can be executed by the processing array 330 in some embodiments. In some other embodiments, i number of work items can be executed by processing array 330 and the rest of work items can be executed by another processing array 330 in another core.

According to some embodiments of the present disclosure, processing array 330 may further include an element-wise operation processor 360. In some embodiments, element-wise operation processor 360 can be positioned at the end of processing strings. In some embodiments, processing strings in each layer of processing array 330 can share element-wise operation processor 360. For example, i number of processing strings in the first layer of processing array 330 can share element-wise operation processor 360. In some embodiments, element-wise operation processor 360 in the first layer of processing array 330 can perform its element-wise operation on each of output values, from accumulators 350_1 to 350_i, such as $r_1\_c_1$ to $r_i\_c_1$, sequentially. Similarly, element-wise operation processor 360 in the $K^{th}$ layer of processing array 330 can perform its element-wise operation on each of output values, from accumulators 350_1 to 350_i, such as $r_1\_c_k$ to $r_i\_c_k$, sequentially. In some embodiments, element-wise operation processor 360 can be configured to perform a plurality of element-wise operations. In some embodiments, element-wise operation performed by the element-wise operation processor 360 may include an activation function such as ReLU function, Leaky ReLU function, Sigmoid function, Tanh function, or the like.

In some embodiments, multiplier 340 or accumulator 350 may be configured to perform its operation on different data type from what the element-wise operation processor 360 performs its operations on. For example, multiplier 340 or accumulator 350 can be configured to perform its operations on integer type data such as Int 8, Int 16, and the like and element-wise operation processor 360 can perform its operations on floating point type data such as FP24, and the like. Therefore, according to some embodiments of the present disclosure, processing array 330 may further include de-quantizer 370 and quantizer 380 with element-wise operation processor 360 positioned therebetween. In some embodiments, batch normalization operations can be merged to de-quantizer 370 because both de-quantizer 370 and batch normalization operations can be performed by multiplication operations and addition operations with constants, which can be provided from constant buffer 2030. In some embodiments, batch normalization operations and de-quantization operations can be merged into one operation by compiler. As shown in FIG. 3, constant buffer 2030 can provide constants to de-quantizer 370 for de-quantization or batch normalization.

Figure 4A:
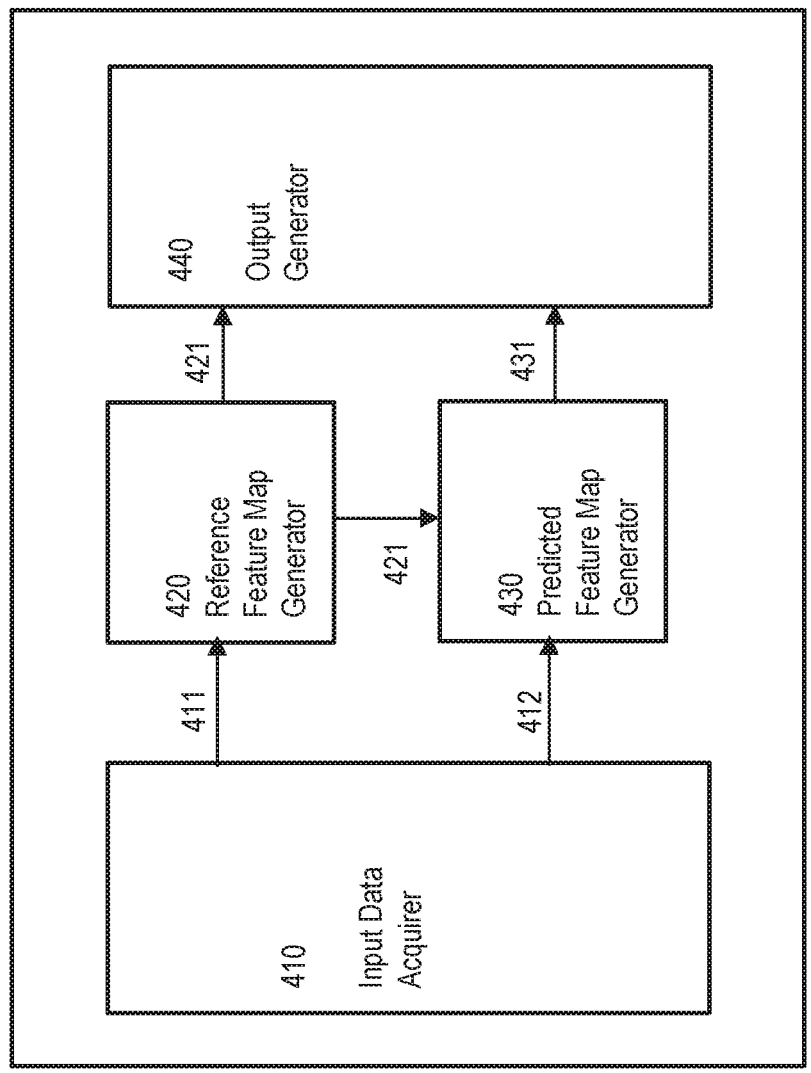
FIG. 4A illustrates a block diagram of an exemplary video processing engine, consistent with some embodiments of the present disclosure.

FIG. 4A illustrates a block diagram of an example video processing engine 400, consistent with some embodiments of the present disclosure. In some embodiments, video processing engine 400 can be implemented in or by accelerator 200 of FIG. 2A. In some embodiments, at least part of video processing engine 400 can be implemented in or by core 202 of FIG. 2B or operation unit 2020 of FIG. 3. As shown in FIG. 4A, video processing engine 400 may comprise an input data acquirer 410, a reference feature map generator 420, a predicted feature map generator 430, and output generator 440.

Input data acquirer 410 can be configured to acquire input data. According to some embodiments of the present disclosure, input data can comprise reference picture 411 and predicted picture information 412. According to some embodiments of the present disclosure, reference picture 411 and a predicted picture corresponding to predicted picture information 412 can be consecutive frames constituting a video.

In the below, encoding and decoding processes for video data are briefly explained referring to FIG. 4B as an example. A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture (intra coded picture)." A picture coded using a previous picture as a reference picture is referred to as a "P-picture (predicted picture)." A picture coded using both a previous picture and a future picture as reference pictures (i.e., the reference is "$b_1$-directional") is referred to as a "B-picture ($b_1$-directional predicted picture)."

Figure 4B:
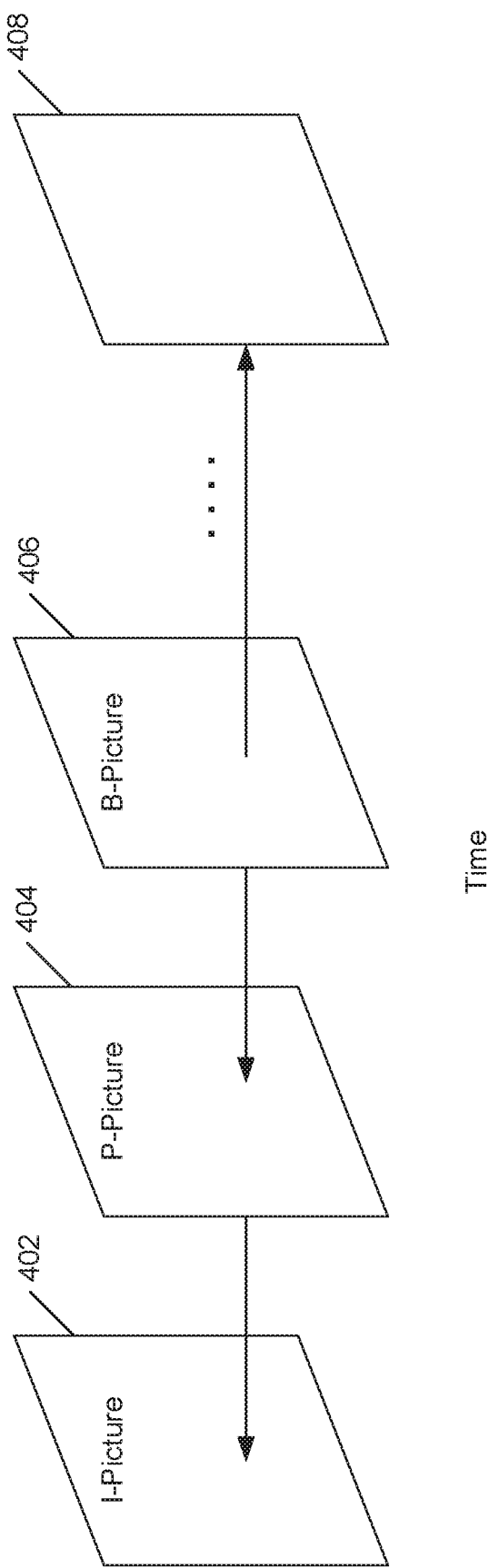
FIG. 4B is a schematic diagram illustrating structures of an example video sequence, consistent with some embodiments of the present disclosure.

FIG. 4B illustrates structures of an example video sequence, according to some embodiments of the present disclosure. The video can be a live video or a video having been captured and archived. The video can be a real-life video, a computer-generated video (e.g., computer game video), or a combination thereof (e.g., a real-life video with augmented-reality effects). The video sequence can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 4B, video sequence can include a series of pictures arranged temporally along a timeline, including pictures 402, 404, 406, and 408. Pictures 402-406 are continuous, and there are more pictures between pictures 406 and 408. In FIG. 4B, picture 402 is an I-picture, the reference picture of which is picture 402 itself. Picture 404 is a P-picture, the reference picture of which is picture 402, as indicated by the arrow. Picture 406 is a B-picture, the reference pictures of which are pictures 404 and 408, as indicated by the arrows. In some embodiments, the reference picture of a picture (e.g., picture 404) can be not immediately preceding or following the picture. For example, the reference picture of picture 404 can be a picture preceding picture 402. It should be noted that the reference pictures of pictures 402-406 are only examples, and the present disclosure does not limit embodiments of the reference pictures as the examples shown in FIG. 4B.

Referring back to FIG. 4A, in some embodiments, reference picture 411 can be a picture decompressed from an I-picture. According to some embodiments of the present disclosure, reference picture 411 can be a reconstructed picture from an I-picture that is an intra-coded picture without referring to other pictures. In some embodiments, reference picture 411 can be a complete image, e.g., JPG or BMP image. In some embodiments, input data acquirer 410 can be configured to acquire a compressed video and to decompress the compressed video to obtain reference picture 411. In some embodiments, input data acquirer 410 may communicate with video decoder (not shown) to receive reference picture 411.

According to some embodiments of the present disclosure, a predicted picture can be a P-picture coded to comprise changes of the predicted picture (i.e., current frame) with respect to a reference picture. In some embodiments, predicted picture information 412 can include change information of a corresponding predicted picture from a reference picture (e.g., reference picture 411 of FIG. 4A). In some embodiments, predicted picture information 412 can include, as change information, motion information, residual information, etc. In some embodiments, motion information can be represented as movements of pixels between a reference picture and a predicted picture. In some embodiments, motion information can be represented as motion vectors that represent position changes of a group of pixels between a current picture and a reference picture. In some embodiments, motion vectors can be estimated based on an optical flow estimation technique in each frame of the video sequence. Optical flow is the distribution of velocities of objects in an image and, by estimating optical flow between video frames, velocities of objects in the video can be measured. In some embodiments, residual information may include differences between a reference picture and a predicted picture except motion information.

In some embodiments, input data acquirer 410 may communicate with video decoder (not shown) to receive predicted picture information 412. In some embodiments, input data acquirer 410 does not necessarily acquire a decompressed picture from a predicted picture, e.g., from a video decoder. According to some embodiments of the present disclosure, input data acquirer 410 can acquire predicted picture information 412 that is embedded in a compressed P-picture format.

Reference feature map generator 420 can be configured to obtain a reference feature map 421 from reference picture 411 acquired by input data acquirer 410. In some embodiments, reference feature map generator 420 can be configured to generate reference feature map 421 from reference picture 411, e.g., by a convolution operation on a convolutional neural network. In some embodiments, reference feature map generation can be performed, e.g., in or by neural network accelerator 200 in FIG. 2A or core 202 in FIG. 2B. In some embodiments, at least part of reference feature map generation can be performed, e.g., in or by operation unit 2020 in FIG. 3.

For illustration purposes, feature map generation process of reference picture 411 will be explained referring back to FIG. 1. As shown in FIG. 1, reference picture 411 can be input data 102 structured as a number (e.g., C) of channels, each of which is a two-dimensional layer having a size of H×W. In some embodiments, reference picture 411 can have three color channels, e.g., red, green, and blue (RGB). Filters 104 can be set to obtain reference feature map 421 from input data 102. A number of filters 104 corresponds to a number of channels of reference feature map 421 obtained by a convolution operation between the filters 104 and input data 102. As shown in FIG. 1, a convolution operation between input data 102 and K number of filters 104_1 to 104_k results in generating output data 106 having K number of channels corresponding to the number of filters 104. As shown in FIG. 1, reference feature map 421 having K number of channels can be generated and each of K number of channels can have a size of T×U. In some embodiments, reference feature map generator 420 can generate reference feature map 421, e.g., by ResNet 152, VGG 19, etc. According to some embodiments of the present disclosure, reference feature map generator 420 can be implemented as a complete feature extraction network that extracts feature maps based on decompressed pictures.

Referring back to FIG. 4A, predicted feature map generator 430 can be configured to generate predicted feature map 431 of a predicted picture. In some embodiments, predicted feature map generator 430 can generate predicted feature map 431 of a predicted picture, e.g., by propagating reference feature map 421 of reference picture 411 based on predicted picture information 412. According to some embodiments of the present disclosure, feature maps for a predicted picture can be generated based on predicted picture information 412 without decompressing a predicted picture.

It will be appreciated that feature map propagation process is not limiting and will be explained for only illustration purposes in the present disclosure. In some embodiments, predicted picture information 412 can comprise motion information. In some embodiments, motion information can represent movements of pixels between reference picture 411 and a predicted picture. While motion information does not directly represent movement of features, motion information can still indicate high-level directions of feature movement. Therefore, according to some embodiments of the present disclosure, predicted feature map 431 of a predicted picture can be obtained from reference feature map 421 by using motion information of the predicted picture from reference picture 411.

In some embodiments, motion information can comprise motion vectors corresponding to a plurality of pixels of a predicted picture. For example, motion information can be represented by a plurality of motion vectors arranged in a matrix corresponding to a predicted picture. According to some embodiments of the present disclosure, motion vectors can indicate how pixels of a predicted picture have moved from a reference picture (e.g., 411). As shown in FIG. 1, a predicted picture can have a same size as reference picture 411, e.g., input data 102 structured as a number (e.g., C) of channels, each of which is a two-dimensional layer having a size of H×W. Therefore, a plurality of motion vectors of a predicted picture can be arranged in a matrix having H rows and W columns.

As illustrated above, motion information can have a size corresponding to a size of a picture (e.g., H×W) and may not match a size (e.g., T×U) of feature map 421 of reference picture 411. Therefore, feature map 421 of reference picture 411 may not be adequately propagated to generate predicted feature map 431 of a predicted picture based on the motion information. In some embodiments, motion information can be resized to match a size of feature map 421 of reference picture 411. In some embodiments, resizing of feature map 421 can be performed, e.g., by linear resizing such as average pooling. In some embodiments, resizing of feature map 421 can be implemented by second operation unit 2022 in FIG. 2B. By resizing, motion information of a size H×W can be transformed to a resized motion information of a size T×U that is the same as a feature map size of reference picture 411.

Because a motion vector in motion information represents a distance of pixel movement in a range of motion information, x values and y values of motion vectors in motion information may vary from 0 to H and from 0 to W, respectively. However, resized motion information has a size of T×U and thus values of motion vectors in resized motion information may not adequately represent a distance of pixel movement in resized motion information. Therefore, according to some embodiments of the present disclosure, motion vectors of resized motion information can be rescaled, e.g., according to a ratio of the resizing. In some embodiments, a ratio of resizing can be determined based on a size of motion information and a size of resized motion information. A resizing ratio of a row dimension can be represented as T/H and a resizing ratio of a column dimension can be represented as U/W. In some embodiments, x values of motion vectors of resized motion information can be rescaled by multiplying the resizing ratio of a row dimension (e.g., T/H) and y values of motion vectors of resized motion information can be rescaled by multiplying the resizing ratio of a row dimension (e.g., U/W).

According to some embodiments of the present disclosure, predicted feature map 431 can be generated by propagating reference feature map 421 based on the resized and rescaled motion information of a predicted feature map. For example, a feature value of predicted feature map 431 can be determined based on feature value(s) of reference feature map 421, wherein the feature value(s) of reference feature map 421 correspond to pixels in reference picture 411 before movement. In some embodiments, a feature value of predicted feature map 431 can be determined based on feature values from reference feature map 421 by an interpolation operation.

Although transforming one channel of reference feature map 421 into one channel of predicted feature map 431 has been explained, similar transformation can be performed for each of a plurality of channels of reference feature map 421 (e.g., K number of channels shown in FIG. 1) to obtain a plurality of channels of predicted feature map 431. According to some embodiments of the present disclosure, when propagating reference feature map 421 to generate predicted feature map 431, residual information included in predicted picture information 412 can further be used to complement predicted feature map 431. Similar to motion information, residual information can be resized or rescaled before being combined to predicted feature map 431 generated based on motion information.

While one example of feature propagation process is illustrated above, it will be appreciated that any other feature propagation processes that enable generating a predicted feature map by propagating a reference feature map can be applied in the present disclosure. In some embodiments, a feature propagation function that defines how feature values of reference feature map 421 can propagate as feature values of predicted feature map 431 can be used. In some embodiments, a feature propagation function can be trained, e.g., by using a machine learning algorithm on an accelerator (e.g., accelerator 200 of FIG. 2A). According to some embodiments of the present disclosure, computation for generating predicted feature map 431 by propagation of reference feature map 421 based on predicted picture information 412 can be less compute-intensive and less-time consuming, and thus predicted feature map generator 430 can be implemented as a lighter or smaller network than that of reference feature map generator 420.

While some embodiments of the present disclosure have been illustrated with respect to reference picture 411 that is a key frame and a predicted picture that is a subsequent frame to the reference picture 411, it will be appreciated that the present disclosure can also be applied for generating a predicted feature map of a second predicted picture that is subsequent to the predicted picture by using predicted feature map 431 as a reference feature map.

Referring back to FIG. 4A, output generator 440 is configured to generate outputs from acquired feature maps such as reference feature map 421, predicted feature map 431, etc. In some embodiments, output generator 440 can predict outputs for reference picture 411, predicted picture, etc. according to its tasks. For example, output generator 440 can perform image recognition, e.g. image classification, semantic segmentation, object detection, etc. for an image (e.g., reference image 411, a predicted picture, etc.) based on corresponding feature maps such as reference feature map 421, predicted feature map 431, etc. According to some embodiments of the present disclosure, output generator 440 can be implemented as a task network that can vary depending on applications.

As discussed above referring to FIG. 4A, according to some embodiments of the present disclosure, feature maps for predicted pictures can be generated by propagating reference feature maps based on predicted picture information. Motion estimation and feature propagation are generally much faster than computation of a complete feature network that extracts feature maps from a reconstructed or decompressed image. Thereby, feature maps of predicted picture can be generated with light-weight networks and computational efficiency in view of computing resources and time for generating feature maps on CNN-based network, e.g., Feature Net, can be improved. While feature propagation scheme can considerably reduce a computation amount and time, it causes imbalance in computation time between for generating a reference feature map and for generating a predicted feature map. Such imbalance inference time is not desirable for processing video data in real time for providing a real-time video service, e.g., for autonomous driving, video surveillance, online gaming, conferencing, live broadcasting, etc.

Figure 4C:
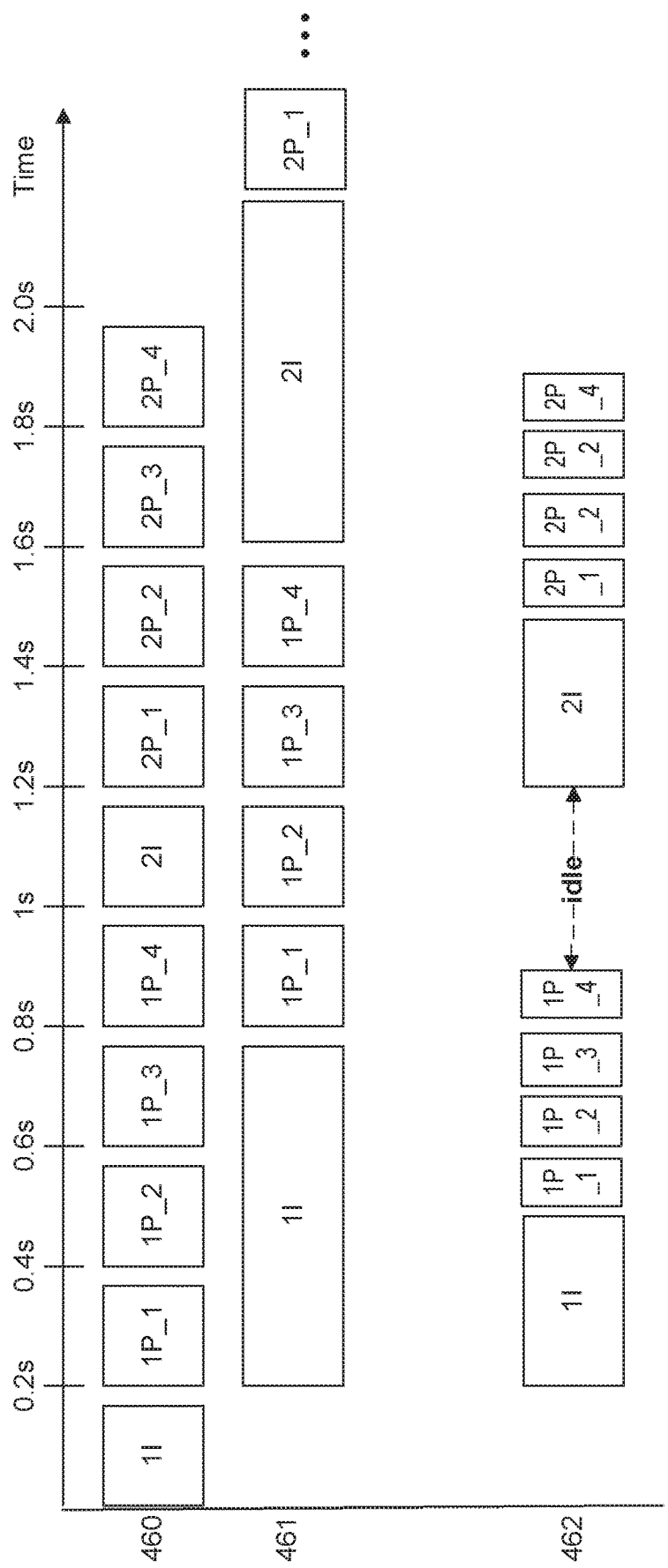
FIG. 4C illustrates first and second example runtime of feature network in FIG. 4A, consistent with some embodiments of the present disclosure.

FIG. 4C illustrates first and second example runtime of feature network in FIG. 4A, consistent with some embodiments of the present disclosure. In FIG. 4C, 10 consecutive pictures constituting a video are shown and, among 10 pictures, two pictures 1I and 2I are I-pictures and 8 pictures 1P_1 to 1P_4 and 2P_1 to 2P_4 are P-pictures. In this disclosure, first I-picture 1I and following four P-pictures 1P_1 to 1P_4 can be referred to a first group and second I-picture 2I and following four P-pictures 2P_1 to 2P_4 can be referred to a second group. In this example, it is assumed that first four P-pictures 1P_1 to 1P_4 reference first I-picture 1I and second four P-pictures reference second I-picture 2I, or each of 8 pictures 1P_1 to 1P_4 and 2P_1 to 2P_4 can reference an immediately preceding picture. It is also assumed that, as shown as decoding runtime 460 in FIG. 4C, decoding time for each picture is 0.2 s. In FIG. 4C, two example runtime 461 and 462 of generating feature maps for 10 consecutive pictures based on a video processing engine (e.g., video processing engine 400 of FIG. 4A) are illustrated.

First runtime 461 in FIG. 4C illustrates processing time for generating feature maps for 10 consecutive pictures when computation resources are limited. As explained below, generating a reference feature map (e.g., reference feature map 421 of FIG. 4A) by a reference feature map generator (e.g., reference feature map generator 420 of FIG. 4A) consumes more computing power than generating a predicted feature map (e.g., predicted feature map 431 of FIG. 4A) by a predicted feature map generator (e.g., 430 of FIG. 4A). Therefore, when an equal amount of computation resources are used to generate a reference feature map and to generate a predicted feature map, processing time for generating a reference feature map is longer than processing time for generating a predicted feature map as shown in FIG. 4C.

As shown in FIG. 4C, feature map generation process for each group can start only after corresponding I-picture (e.g., 1I or 2I) is decoded. For example, generating a reference feature map for first I-picture 1I can be commenced after decoding of first I-picture 1I is completed. In first runtime 461 in FIG. 4C, it is assumed that generating feature maps for I-pictures 1I and 2I takes 0.6 s each and generating feature maps for P-pictures 1P_1 to 1P_4 and 2P_1 and 2P_4 takes 0.2 s each. As shown in FIG. 4C, because computation resources that are used for generating feature maps for a first group are also used to perform generation of feature maps for a second group, generating a reference feature map for second I-picture 2I cannot get started until after generation of a feature map for fourth P-picture 1P_4 of the first group is completed. Therefore, generation of a reference feature map for second I-picture 2I are delayed further even after decoding of second I-picture 2I is completed. As shown in FIG. 4C, total processing time for generating feature maps of 10 pictures may be longer than video decoding time. Therefore, in scenarios corresponding to first runtime 461, video processing engine 400 cannot support real-time video service.

Second runtime 462 in FIG. 4C illustrates processing time for generating feature maps for 10 consecutive pictures when computation resources are enough. In this example, processing time for generating a reference feature map is still longer than processing time for generating a predicted feature map because an equal amount of computation resources are used to generate a reference feature map and to generate a predicted feature map. As computation resources used for generating feature maps increase, total runtime for generation of feature maps can be equal to or less than decoding time for corresponding pictures as shown as second runtime 462 in FIG. 4C. However, even when runtime for generating feature maps is equal to or less than decoding time, processing time for generating a reference feature map can be longer than processing time for generating a predicted feature map as shown in second runtime 462 of FIG. 4C. Such latency brought by an accelerator (e.g., accelerator 200 of FIG. 2A) can cause motion artifacts (e.g., motion judger), which in turn degrades quality of service (QoS) for live video services. In second runtime 462 of FIG. 4C, even after generating feature maps for a first group is completed, generating a reference feature map for second I-picture 2I cannot get started until after second I-picture 2I is decoded. Therefore, as shown in second runtime 462 of FIG. 4C, computation resources may be idle after completing generation of feature maps for a first group and before starting generation of feature maps for a second group unless runtime for generating features maps are accurately adjusted when assigning computation resources therefor.

Figure 5:
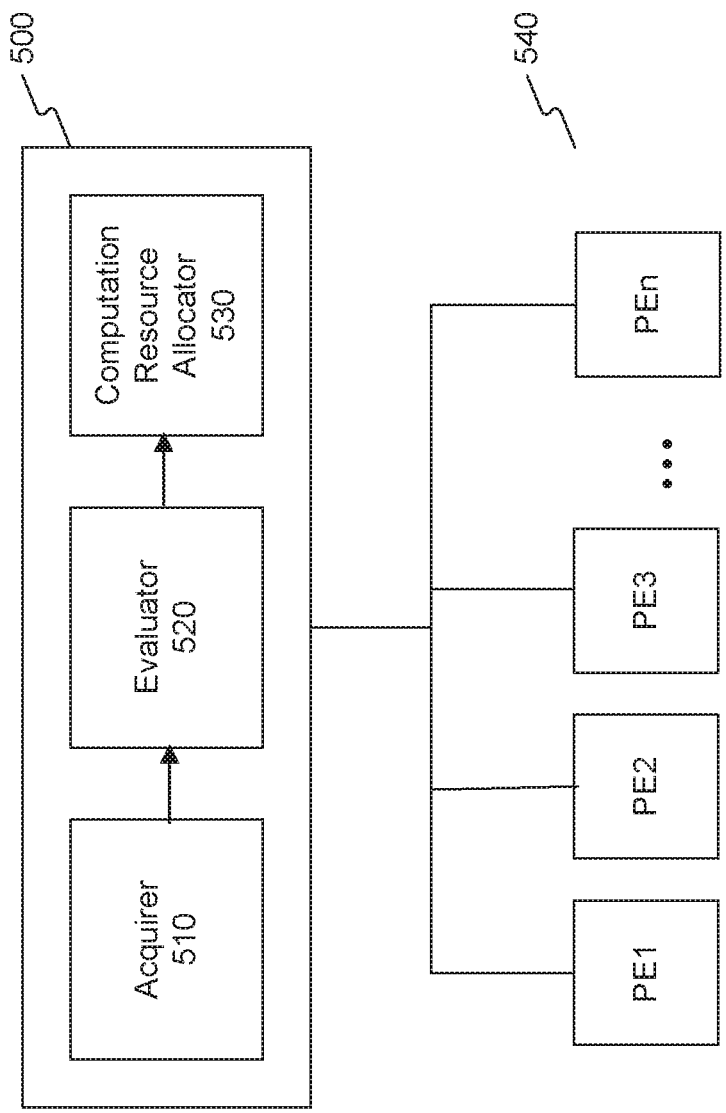
FIG. 5 illustrates a block diagram of an exemplary scheduling apparatus for video processing, consistent with some embodiments of the present disclosure.

FIG. 5 illustrates a block diagram of an exemplary scheduling apparatus for video processing, consistent with some embodiments of the present disclosure. In some embodiments, scheduling apparatus 500 can be implemented in or by a host unit (e.g., host unit 220 of FIG. 2A). In some embodiments, scheduling apparatus 500 may be implemented within a compiler. In some embodiments, scheduler 500 may be implemented in runtime libraries.

As shown in FIG. 5, scheduling apparatus 500 is configured to allocate computation resources 540 for generating reference feature maps (e.g., performed by reference feature map generator 420 of FIG. 4A) and for generating predicted feature maps (e.g., performed by predicted feature map generator 430 of FIG. 4A). In FIG. 5, computation resources 540 may include a plurality of processing elements PE1 to PEn. In some embodiments, processing elements PE1 to PEn may be included in one accelerator (e.g., accelerator 200 of FIG. 2A) or included in multiple accelerators. In some embodiments, processing elements PE1 to PEn can be a core (e.g., core 202 of FIG. 2A and FIG. 2B). In some embodiments, processing elements PE1 to PEn may be processing elements included in one core (e.g., core 202 of FIG. 2A and FIG. 2B). In some embodiments, processing elements PE1 to PEn can be heterogeneous processing elements where processing elements do not have equal processing performance. For example, at least two of the plurality of processing elements PE1 to PEn have different processing speeds, power consumptions, transfer costs, etc. In some embodiments, at least two of the plurality of processing elements PE1 to PEn may have different architecture with each other.

As shown in FIG. 5, scheduling apparatus 500 may comprise acquirer 510, evaluator 520, and computation resource allocator 530, consistent with some embodiments of the present disclosure. Acquirer 510 can acquire information about feature networks, video data, video processing requirements, available computation resources, etc. In some embodiments, information about feature networks may include information of feature network models used in a reference feature map generator (e.g., reference feature map generator 420 of FIG. 4A) and a predicted feature map generator (e.g., predicted feature map generator 430 of FIG. 4A). In some embodiments, information about vide data may include configuration information of video data, e.g., a sequence of I-pictures and P-pictures, a number of frames, referencing relationship between I-pictures and P-pictures, etc. In some embodiments, information about video processing requirements may include information about decoding time for each frame, total decoding time for video data, tolerable delay for video processing, etc. In some embodiments, available computation resources may include information of processing elements PE1 to PEn that are available for video processing, information of whether computation resources are configurable or not.

According to some embodiments of the present disclosure, evaluator 520 can be configured to determine a ratio of runtime for generating a reference feature map (e.g., reference feature map 421 of FIG. 4A) to runtime for generating a predicted feature map (e.g., predicted feature map 431 of FIG. 4A) of acquired video data by using feature networks (e.g., reference feature map generator 420 and predicted feature map generator 430 of FIG. 4A). In some embodiments, evaluator 520 can estimate runtime for generating a reference feature map of a reference picture by a reference feature map generator with a unit computation resource based on acquired information. Similarly, evaluator 520 can estimate runtime for generating a predicted feature map of a predicted picture by a predicted feature map generator with a unit computation resource. For example, as shown in first runtime 461 of FIG. 4C, processing time for generating a reference feature map is three times longer than processing time for generating a predicted feature map, and thus evaluator 520 can determine a runtime ratio as three.

Referring back to FIG. 5, according to some embodiments of the present disclosure, computation resource allocator 530 can be configured to allocate computation resources 540 for generating reference feature maps and predicted feature maps based on the evaluation by evaluator 520 and information acquired by acquirer 510. According to some embodiments of the present disclosure, computation resource allocator 530 can be configured to allocate computation resources 540 such that feature maps including reference features maps and predicted feature maps are generated at regular time intervals. According to some embodiments of the present disclosure, computation resource allocator 530 can be configured to allocate computation resources 540 such that feature maps including reference features maps and predicted feature maps are generated at a same rate at which corresponding pictures corresponding to the feature maps are decoded. According to some embodiments of the present disclosure, computation resource allocator 530 can be configured to allocate computation resources 540 such that feature maps including reference features maps and predicted feature maps are generated at a same speed as corresponding pictures corresponding to the feature maps are decoded.

Figure 6A:
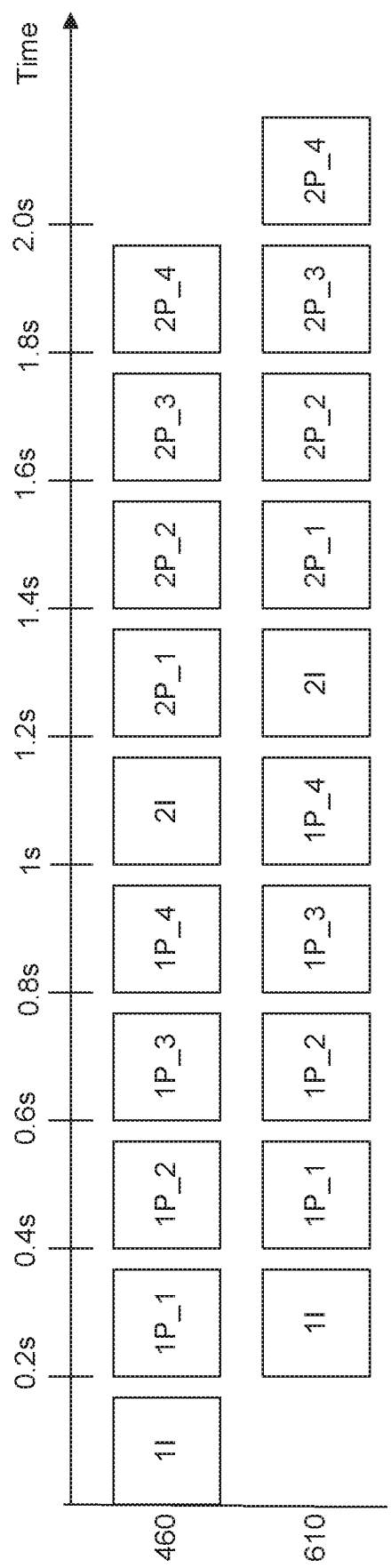
FIG. 6A illustrates third example runtime for video data processing, consistent with some embodiments of the present disclosure.

In some embodiments, computation resource allocator 530 may allocate more computation resources for generating reference feature maps than for generating predicted feature maps such that processing time for generating reference feature maps equals to processing time for generating predicted feature maps. In some embodiments, computation resource allocation 530 can allocate computation resources such that computing power per unit time for generating a reference feature map is greater than computing power per unit time for generating a predicted feature map. FIG. 6A illustrates third example runtime 610 for video data processing, consistent with some embodiments of the present disclosure. FIG. 6A also illustrates 10 consecutive pictures that are explained with respect to FIG. 4C as an example. In FIG. 6A, it is also assumed that decoding time for each picture is 0.2 s.

In this example, computation resource allocator 530 can allocate computation resources three times more for generating reference feature maps than for generating predicted feature maps because a runtime ratio is three as illustrated referring to FIG. 4C. In this example, a ratio of computing power per unit time for generating a reference feature map to computing power per unit time for generating a predicted feature map can be three. For example, computation resource allocator 530 can allocate three processing elements PE1 to PE3 for generating reference feature maps and allocate one processing element PE1 for generating predicted feature maps under assumption that processing elements PE1 to PE3 have equal computing power. In some embodiments, a computation resource (e.g., PE2 and PE3) that is used for generating reference feature maps but not used for generating predicted feature maps can be allocated for other tasks when another computation resource (e.g., PE1) performs generation of predicted feature maps. For example, processing elements PE2 and PE3 can be used for other tasks during a time period between a starting point (e.g., 0.4 s) for generating a predicted feature map for first predicted picture 1P_1 and an ending point (e.g., 1.2 s) for generating a predicted feature map for fourth predicted picture 1P_4.

As shown in third runtime 610 of FIG. 6A, feature maps are generated at a same rate at which corresponding pictures are decoded except that feature map generation is delayed. For example, feature maps are generated every 0.2 s with 0.2 s delay for processing time for generating a first reference picture for first reference picture 1I in third runtime 610. Thereby, according to some embodiments applying third runtime 610, live video service can be provided with a delay in the beginning. According to some embodiments of the present disclosure, once live video service is commenced after the delay in the beginning, seamless live video service can be provided without further delay or distortion. In some embodiments, the delay can be adjusted to meet a tolerable delay requirement of a certain application by adjusting an amount of computation resources to be allocated. In some embodiments, computation resource allocation method illustrated in third runtime 610 of FIG. 6A can be applied when a hardware engine comprising computation resources for performing feature map generation is configurable. For example, computation resource allocation method illustrated in third runtime 610 of FIG. 6A can be applied when processing elements PEs are configurable to process different tasks during runtime.

Figure 6B:
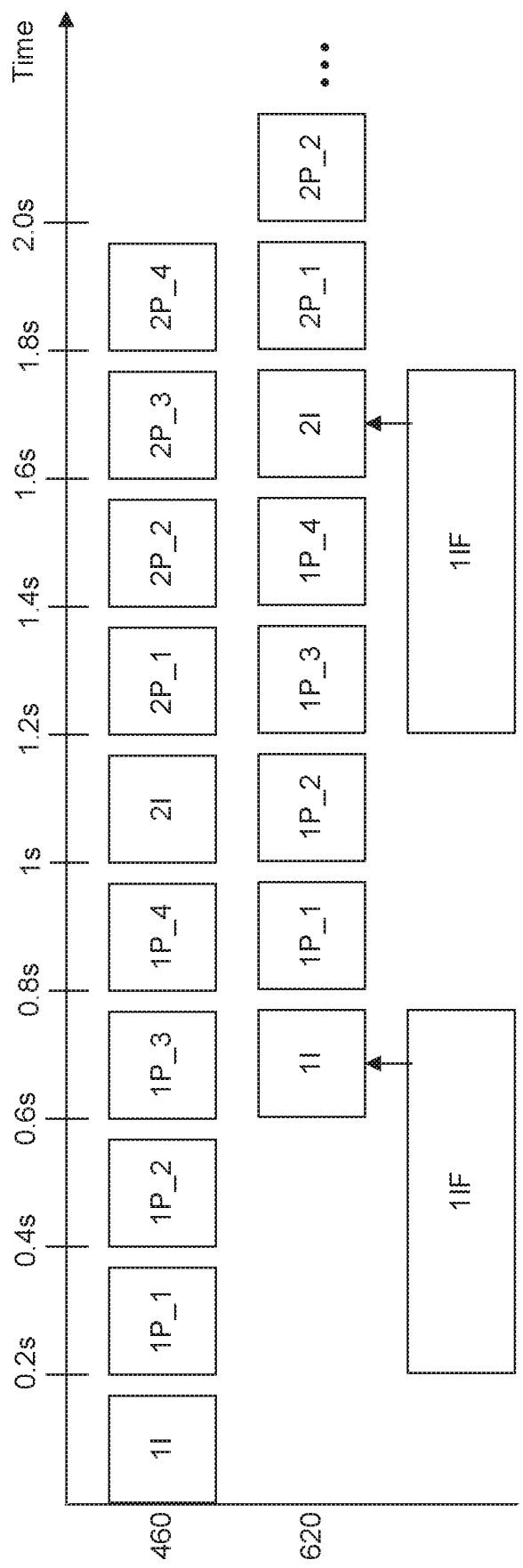
FIG. 6B illustrates fourth example runtime for video data processing, consistent with some embodiments of the present disclosure.

Referring back to FIG. 5, according to some embodiments of the present disclosure, computation resource allocator 530 may allocate different computation resources for generating reference feature maps and for generating predicted feature maps such that feature maps including reference features maps and predicted feature maps are generated with regular time intervals. FIG. 6B illustrates fourth example runtime 620 for video data processing, consistent with some embodiments of the present disclosure. FIG. 6B also illustrates 10 consecutive pictures that are explained with respect to FIG. 4C as an example. In FIG. 6B, it is also assumed that decoding time for each picture is 0.2 s. In this example, computation resource allocator 530 can allocate different computation resources so that generating reference feature maps and generating predicted feature maps can be parallelly performed. For example, computation resource allocator 530 can allocate one or more processing elements (e.g., PE1) for generating reference feature maps and allocate one or more other processing elements (e.g., PE2) for generating predicted feature maps.

As shown in fourth runtime 620 in FIG. 6B, generation of a first reference feature map can be performed by a first computation resource(s) after decoding of first reference picture 1I is completed and generation of following predicted feature maps for first four predicted pictures 1P_1 to 1P_4 can be performed by a second computation resource(s) after first reference feature map generation is completed. While a second computation resource(s) performs generation of predicted feature maps (e.g., for third first predicted picture and fourth first predicted picture 1P_3 and 1P_4), a first computation resource(s) can commence its performance for generating a second reference feature map for second reference picture 2I after decoding of second reference picture 2I is completed (e.g., at a time point 1.2 s). Similarly, generation of following predicted feature maps for second four predicted pictures 2P_1 to 2P_4 can be performed by a second computation resource(s) that has been used for generating predicted feature maps for first four predicted pictures 1P_1 to 1P_4.

As shown in fourth runtime 620 of FIG. 6B, feature maps are generated at a same rate at which corresponding pictures are decoded except that feature map generation is delayed. For example, feature maps are generated every 0.2 s with 0.6 s delay for processing time for generating first reference picture for first reference picture 1I in fourth runtime 620. Thereby, according to some embodiments applying fourth runtime 620, live video service can be supported with a delay in the beginning. According to some embodiments of the present disclosure, once live video service is commenced after the delay in the beginning, seamless live video service can be provided without further delay or distortion. In some embodiments, the delay can be adjusted to meet a tolerable delay requirement of a certain application by adjusting an amount of computation resources to be allocated for generating a reference picture. In some embodiments, computation resource allocation method illustrated in fourth runtime 620 of FIG. 6B can be applied when a hardware engine comprising computation resources for performing feature map generation is not configurable. For example, computation resource allocation method illustrated in fourth runtime 620 of FIG. 6B can be applied when processing elements PEs are not configurable such that processing elements PEs are predetermined to process a certain task.

According to some embodiments of the present disclosure, an intelligent computing resources allocation scheme can be provided for feature networks for extracting feature maps of a video. According to some embodiments of the present disclosure, quality of service (QoS) of live video services can be improved while improving efficiency of processing videos based on feature propagation. According to some embodiments of the present disclosure, quality of service (QoS) of live video services can be improved by reducing motion artifacts. According to some embodiments of the present disclosure, various live video applications can be provided by employing various task networks depending on applications. According to some embodiments of the present disclosure, feature maps comprising a reference feature map and a predicted feature map can be generated at regular time intervals.

Figure 7:
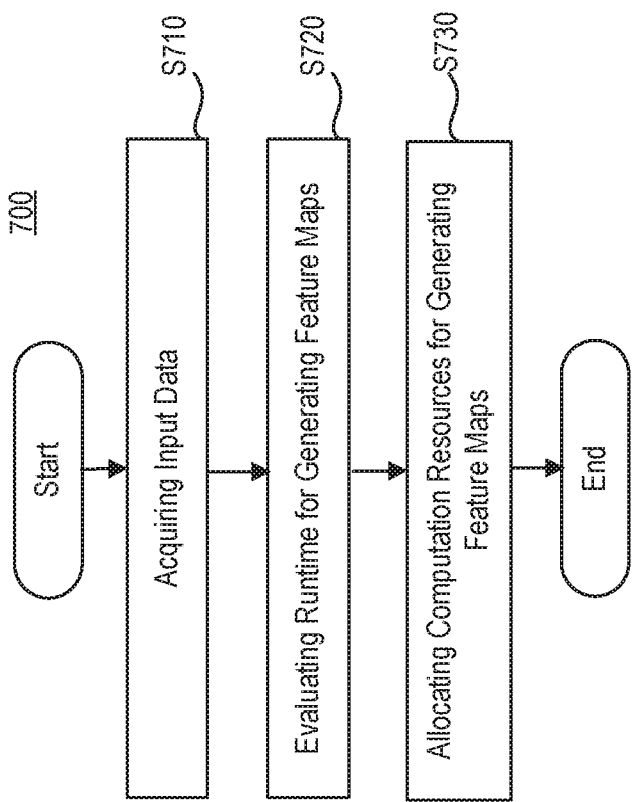
FIG. 7 illustrates an exemplary flow diagram for a scheduling method for video processing, consistent with some embodiments of the present disclosure.

FIG. 7 illustrates an exemplary flow diagram for a scheduling method for video processing, consistent with some embodiments of the present disclosure. For illustrative purposes, scheduling method 700 for video processing will be described referring to scheduling apparatus 500 of FIG. 5 and video processing engine 400 of FIG. 4. In some embodiments, scheduling method 700 can be performed in or by a host unit (e.g., host unit 220 of FIG. 2A).

In step S710, input data is acquired. Step S710 can be performed by, for example, acquirer 510, among others. According to some embodiments of the present disclosure, input data can comprise information about feature networks, video data, video processing requirements, available computation resources, etc. In some embodiments, information about feature networks may include information of feature network models used in a reference feature map generator (e.g., reference feature map generator 420 of FIG. 4A) and a predicted feature map generator (e.g., predicted feature map generator 430 of FIG. 4A). In some embodiments, information about vide data may include configuration information of video data, e.g., a sequence of I-pictures and P-pictures, a number of frames, referencing relationship between I-pictures and P-pictures, etc. In some embodiments, information about video processing requirements may include information about decoding time for each frame, total decoding time for video data, tolerable delay for video processing, etc. In some embodiments, available computation resources may include information of processing elements PE1 to PEn that are available for video processing, information of whether computation resources are configurable or not.

In step S720, runtime for generating feature maps can be evaluated. Step S720 can be performed by, for example, evaluator 520, among others. According to some embodiments of the present disclosure, a ratio of runtime for generating a reference feature map (e.g., reference feature map 421 of FIG. 4A) to runtime for generating a predicted feature map (e.g., predicted feature map 431 of FIG. 4A) of acquired video data by using feature networks (e.g., reference feature map generator 420 and predicted feature map generator 430 of FIG. 4A) can be determined. In some embodiments, runtime for generating a reference feature map of a reference picture by a reference feature map generator with a unit computation resource based on acquired information can be estimated. Similarly, runtime for generating a predicted feature map of a predicted picture by a predicted feature map generator with a unit computation resource can be estimated. For example, as shown in first runtime 461 of FIG. 4C, processing time for generating a reference feature map is three times longer than processing time for generating a predicted feature map and thus a runtime ratio can be estimated as three.

In step S730, computation resources can be allocated for generating feature maps. Step S730 can be performed by, for example, computation resource allocator 530, among others. According to some embodiments of the present disclosure, computation resources 540 can be allocated for generating reference feature maps and predicted feature maps based on the evaluation in step S720 and information acquired in step S710. According to some embodiments of the present disclosure, computation resources 540 can be allocated such that feature maps including reference features maps and predicted feature maps are generated at regular time intervals. According to some embodiments of the present disclosure, computation resources 540 can be allocated such that feature maps including reference features maps and predicted feature maps are generated at a same rate at which corresponding pictures corresponding to the feature maps are decoded. According to some embodiments of the present disclosure, computation resources 540 can be allocated such that feature maps including reference features maps and predicted feature maps are generated at a same speed as corresponding pictures corresponding to the feature maps are decoded.

In some embodiments, more computation resources can be allocated for generating reference feature maps than for generating predicted feature maps such that processing time for generating reference feature maps equals to processing time for generating predicted feature maps. In some embodiments, computation resources can be allocated such that computing power per unit time for generating a reference feature map is greater than computing power per unit time for generating a predicted feature map. FIG. 6A illustrates third example runtime 610 for video data processing, consistent with some embodiments of the present disclosure. In this example, three times more computation resources are allocated for generating reference feature maps than for generating predicted feature maps because a runtime ratio is three as illustrated referring to FIG. 4C. In this example, a ratio of computing power per unit time for generating a reference feature map to computing power per unit time for generating a predicted feature map can be three. For example, three processing elements PE1 to PE3 can be allocated for generating reference feature maps and one processing element PE1 can be allocated for generating predicted feature maps under assumption that processing elements PE1 to PE3 have equal computing power.

As shown in third runtime 610 of FIG. 6A, feature maps are generated at a same rate at which corresponding pictures are decoded except that feature map generation is delayed. For example, feature maps are generated every 0.2 s with 0.2 s delay for processing time for generating a first reference picture for first reference picture 1I in third runtime 610. In some embodiments, the delay can be adjusted to meet a tolerable delay requirement of a certain application by adjusting an amount of computation resources to be allocated. In some embodiments, computation resource allocation method illustrated in third runtime 610 of FIG. 6A can be applied when a hardware engine comprising computation resources for performing feature map generation is configurable.

In some embodiments, different computation resources can be allocated for generating reference feature maps and for generating predicted feature maps such that feature maps including reference features maps and predicted feature maps are generated with regular time intervals. FIG. 6B illustrates fourth example runtime 620 for video data processing, consistent with some embodiments of the present disclosure. In this example, different computation resources are allocated so that generating reference feature maps and generating predicted feature maps can be parallelly performed. For example, one or more processing elements (e.g., PE1) are allocated for generating reference feature maps and one or more other processing elements (e.g., PE2) are allocated for generating predicted feature maps.

As shown in fourth runtime 620 in FIG. 6B, generation of a first reference feature map can be performed by a first computation resource(s) after decoding of first reference picture 1I is completed and generation of following predicted feature maps for first four predicted pictures 1P_1 to 1P_4 can be performed by a second computation resource(s) after first reference feature map generation is completed. While a second computation resource(s) performs generation of predicted feature maps (e.g., for third first predicted picture and fourth first predicted picture 1P_3 and 1P_4), a first computation resource(s) can commence its performance for generating a second reference feature map for second reference picture 2I after decoding of second reference picture 2I is completed (e.g., at a time point 1.2 s). Similarly, generation of following predicted feature maps for second four predicted pictures 2P_1 to 2P_4 can be performed by a second computation resource(s) that has been used for generating predicted feature maps for first four predicted pictures 1P_1 to 1P_4.

As shown in fourth runtime 620 of FIG. 6B, feature maps are generated at a same rate at which corresponding pictures are decoded except that feature map generation is delayed. For example, feature maps are generated every 0.2 s with 0.6 s delay for processing time for generating first reference picture for first reference picture 1I in fourth runtime 620. In some embodiments, the delay can be adjusted to meet a tolerable delay requirement of a certain application by adjusting an amount of computation resources to be allocated for generating a reference picture. In some embodiments, computation resource allocation method illustrated in fourth runtime 620 of FIG. 6B can be applied when a hardware engine comprising computation resources for performing feature map generation is not configurable.

The embodiments may further be described using the following clauses:

1. A method for scheduling computation resources for generating feature maps for video, comprising:
   determining runtime for generating feature maps of a reference picture and a predicted picture;
   determining available computation resources for generating the feature maps; and
   allocating, based on the runtime, one or more computation resources among the available computation resources for generating the feature maps such that the feature maps are generated at regular time intervals.

2. The method of clause 1, wherein allocating, based on the runtime, the one or more computation resources among the available computation resources for generating the feature maps comprises:
   allocating one or more computation resources such that a ratio of first computation power per unit time to be used for generating a reference feature map of the reference picture to second computation power per unit time to be used for generating a predicted feature map of the predicted picture corresponds to a ratio of first runtime for generating the reference feature map to second runtime for generating the predicted feature map.

3. The method of clause 1, wherein allocating, based on the runtime, the one or more computation resources among the available computation resources for generating the feature maps comprises:
   allocating a first group of computation resources for generating a reference feature map of the reference picture and a second group of computation resources for generating a reference feature map of the predicted picture.

4. The method of any one of clauses 1-3, wherein allocating, based on the runtime, the one or more computation resources among the available computation resources for generating the feature maps comprises:
   allocating one or more computation resources among the available computation resources for generating the feature maps such that the feature maps are generated at a rate at which pictures corresponding to the feature maps are decoded.

5. The method of any one of clauses 1-4, wherein the reference picture is an intra coded picture (I-picture) and a reference feature map of the reference picture is generated based on a decompressed reference picture.
6. The method of any one of clauses 1-5, wherein the predicted picture is a predicted picture (P-picture) comprising motion information of the predicted picture with respect to the reference picture, and a predicted picture feature map of the predicted picture is generated from a reference feature map of the reference picture by propagation based on the motion information.
7. The method of any one of clauses 1-6, wherein allocating, based on the runtime, the one or more computation resources among the available computation resources for generating the feature maps comprises:
allocating one or more computation resources among the available computation resources for generating the feature maps such that the feature maps are generated with a predetermined delay after pictures corresponding to the feature maps are decoded.
8. An apparatus for scheduling computation resources for generating feature maps for video, comprising:
at least one processor configured to execute a set of instructions to cause the apparatus to perform:
determining runtime for generating feature maps of a reference picture and a predicted picture;
determining available computation resources for generating the feature maps; and
allocating, based on the runtime, one or more computation resources among the available computation resources for generating the feature maps such that the feature maps are generated at regular time intervals.
9. The apparatus of clause 8, wherein in allocating, based on the runtime, the one or more computation resources among the available computation resources for generating the feature maps, the at least one processor is configured to execute the set of instructions to cause the apparatus to further perform:
allocating one or more computation resources such that a ratio of first computation power per unit time to be used for generating a reference feature map of the reference picture to second computation power per unit time to be used for generating a predicted feature map of the predicted picture corresponds to a ratio of first runtime for generating the reference feature map to second runtime for generating the predicted feature map.
10. The apparatus of clause 8, wherein in allocating, based on the runtime, the one or more computation resources among the available computation resources for generating the feature maps, the at least one processor is configured to execute the set of instructions to cause the apparatus to further perform:
allocating a first group of computation resources for generating a reference feature map of the reference picture and a second group of computation resources for generating a predicted feature map of the predicted picture.
11. The apparatus of any one of clauses 8-10, wherein in allocating, based on the runtime, the one or more computation resources among the available computation resources for generating the feature maps, the at least one processor is configured to execute the set of instructions to cause the apparatus to further perform:
allocating one or more computation resources among the available computation resources for generating the feature maps such that the feature maps are generated at a rate at which pictures corresponding to the feature maps are decoded.
12. The apparatus of any one of clauses 8-11, wherein the reference picture is an intra coded picture (I-picture) and a reference feature map of the reference picture is generated based on a decompressed reference picture.
13. The apparatus of any one of clauses 8-12, wherein the predicted picture is a predicted picture (P-picture) comprising motion information of the predicted picture with respect to the reference picture, and a predicted picture feature map of the predicted picture is generated from a reference feature map of the reference picture by propagation based on the motion information.
14. The apparatus of any one of clauses 8-13, wherein in allocating, based on the runtime, the one or more computation resources among the available computation resources for generating the feature maps, the at least one processor is configured to execute the set of instructions to cause the apparatus to further perform:
allocating one or more computation resources among the available computation resources for generating the feature maps such that the feature maps are generated with a predetermined delay after pictures corresponding to the feature maps are decoded.
15. A non-transitory computer readable medium that stores a set of instructions that is executable by at least one processor of a computing device to perform a method for scheduling computation resources for generating feature maps for video, the method comprising:
determining runtime for generating feature maps of a reference picture and a predicted picture;
determining available computation resources for generating the feature maps; and
allocating, based on the runtime, one or more computation resources among the available computation resources for generating the feature maps such that the feature maps are generated at regular time intervals.
16. The computer readable medium of clause 15, wherein in allocating, based on the runtime, the one or more computation resources among the available computation resources for generating the feature maps, the set of instructions that are executable by at least one processor of the computing device to cause the computing device to further perform:
allocating one or more computation resources such that a ratio of first computation power per unit time to be used for generating a reference feature map of the reference picture to second computation power per unit time to be used for generating a predicted feature map of the predicted picture corresponds to a ratio of first runtime for generating the reference feature map to second runtime for generating the predicted feature map.
17. The computer readable medium of clause 15, wherein in allocating, based on the runtime, the one or more computation resources among the available computation resources for generating the feature maps, the set of instructions that are executable by at least one processor of the computing device to cause the computing device to further perform:
allocating a first group of computation resources for generating a reference feature map of the reference picture and a second group of computation resources for generating a reference feature map of the predicted picture.
18. The computer readable medium of any one of clauses 15-17, wherein in allocating, based on the runtime, the one or more computation resources among the available computation resources for generating the feature maps, the set of instructions that are executable by at least one processor of the computing device to cause the computing device to further perform:
allocating one or more computation resources among the available computation resources for generating the feature maps such that the feature maps are generated at a rate at which pictures corresponding to the feature maps are decoded.

19. The computer readable medium of any one of clauses 15-18, wherein the reference picture is an intra coded picture (I-picture) and a reference feature map of the reference picture is generated based on a decompressed reference picture.

20. The computer readable medium of any one of clauses 15-19, wherein the predicted picture is a predicted picture (P-picture) comprising motion information of the predicted picture with respect to the reference picture, and a predicted picture feature map of the predicted picture is generated from a reference feature map of the reference picture by propagation based on the motion information.

21. The computer readable medium of any one of clauses 15-20, wherein in allocating, based on the runtime, the one or more computation resources among the available computation resources for generating the feature maps, the set of instructions that are executable by at least one processor of the computing device to cause the computing device to further perform:
allocating one or more computation resources among the available computation resources for generating the feature maps such that the feature maps are generated with a predetermined delay after pictures corresponding to the feature maps are decoded.

22. A terminal, comprising:
an accelerator comprising computation resources; and
an apparatus for scheduling the computation resources for generating feature maps for video, comprising:
at least one processor configured to execute a set of instructions to cause the apparatus to perform:
determining runtime for generating feature maps of a reference picture and a predicted picture;
determining available computation resources for generating the feature maps; and
allocating, based on the runtime, one or more computation resources among the available computation resources for generating the feature maps such that the feature maps are generated at regular time intervals.

Embodiments herein include database systems, methods, and tangible non-transitory computer-readable media. The methods may be executed, for example, by at least one processor that receives instructions from a tangible non-transitory computer-readable storage medium (such as of a host system having host unit 220 and host memory 221 of FIG. 2A). Similarly, systems consistent with the present disclosure may include at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "non-transitory computer-readable storage medium" should be understood to include tangible items and exclude carrier waves and transient signals.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for scheduling computation resources for generating feature maps for video, comprising:
determining runtime for generating feature maps of a reference picture and a predicted picture;
determining available computation resources for generating the feature maps; and
allocating, based on the runtime, one or more computation resources among the available computation resources for generating the feature maps such that the feature maps are generated at regular time intervals, wherein the feature maps are generated with a predetermined delay after pictures corresponding to the feature maps are decoded such that the feature maps are generated at a same rate at which the pictures corresponding to the feature maps are decoded, and only one feature map is generated in each time interval of the regular time intervals, and wherein runtime for generating a reference feature map of the reference picture is different from runtime for generating a predicted feature map of the predicted picture.

2. The method of claim 1, wherein allocating, based on the runtime, the one or more computation resources among the available computation resources for generating the feature maps comprises:
allocating one or more computation resources such that a ratio of first computation power per unit time to be used for generating the reference feature map of the reference picture to second computation power per unit time to be used for generating the predicted feature map of the predicted picture corresponds to a ratio of first runtime for generating the reference feature map to second runtime for generating the predicted feature map.

3. The method of claim 1, wherein allocating, based on the runtime, the one or more computation resources among the available computation resources for generating the feature maps comprises:
　　allocating a first group of computation resources for generating the reference feature map of the reference picture and a second group of computation resources for generating the predicted feature map of the predicted picture.

4. The method of claim 1, wherein allocating, based on the runtime, the one or more computation resources among the available computation resources for generating the feature maps comprises:
　　allocating one or more computation resources among the available computation resources for generating the feature maps such that the feature maps are generated at a rate at which pictures corresponding to the feature maps are decoded.

5. The method of claim 1, wherein the reference picture is an intra coded picture (I-picture) and the reference feature map of the reference picture is generated based on a decompressed reference picture.

6. The method of claim 1, wherein the predicted picture is a predicted picture (P-picture) comprising motion information of the predicted picture with respect to the reference picture, and
　　the predicted feature map of the predicted picture is generated from the reference feature map of the reference picture by propagation based on the motion information.

7. An apparatus for scheduling computation resources for generating feature maps for video, comprising:
　　at least one processor configured to execute a set of instructions to cause the apparatus to perform:
　　　　determining runtime for generating feature maps of a reference picture and a predicted picture;
　　　　determining available computation resources for generating the feature maps; and
　　　　allocating, based on the runtime, one or more computation resources among the available computation resources for generating the feature maps such that the feature maps are generated at regular time intervals, wherein the feature maps are generated with a predetermined delay after pictures corresponding to the feature maps are decoded such that the feature maps are generated at a same rate at which the pictures corresponding to the feature maps are decoded, and only one feature map is generated in each time interval of the regular time intervals, and wherein runtime for generating a reference feature map of the reference picture is different from runtime for generating a predicted feature map of the predicted picture.

8. The apparatus of claim 7, wherein in allocating, based on the runtime, the one or more computation resources among the available computation resources for generating the feature maps, the at least one processor is configured to execute the set of instructions to cause the apparatus to further perform:
　　allocating one or more computation resources such that a ratio of first computation power per unit time to be used for generating the reference feature map of the reference picture to second computation power per unit time to be used for generating the predicted feature map of the predicted picture corresponds to a ratio of first runtime for generating the reference feature map to second runtime for generating the predicted feature map.

9. The apparatus of claim 7, wherein in allocating, based on the runtime, the one or more computation resources among the available computation resources for generating the feature maps, the at least one processor is configured to execute the set of instructions to cause the apparatus to further perform:
　　allocating a first group of computation resources for generating the reference feature map of the reference picture and a second group of computation resources for generating the predicted feature map of the predicted picture.

10. The apparatus of claim 7, wherein in allocating, based on the runtime, the one or more computation resources among the available computation resources for generating the feature maps, the at least one processor is configured to execute the set of instructions to cause the apparatus to further perform:
　　allocating one or more computation resources among the available computation resources for generating the feature maps such that the feature maps are generated at a rate at which pictures corresponding to the feature maps are decoded.

11. The apparatus of claim 7, wherein the reference picture is an intra coded picture (I-picture) and the reference feature map of the reference picture is generated based on a decompressed reference picture.

12. The apparatus of claim 7, wherein the predicted picture is a predicted picture (P-picture) comprising motion information of the predicted picture with respect to the reference picture, and
　　the predicted feature map of the predicted picture is generated from the reference feature map of the reference picture by propagation based on the motion information.

13. A non-transitory computer readable medium that stores a set of instructions that is executable by at least one processor of a computing device to perform a method for scheduling computation resources for generating feature maps for video, the method comprising:
　　determining runtime for generating feature maps of a reference picture and a predicted picture;
　　determining available computation resources for generating the feature maps; and
　　allocating, based on the runtime, one or more computation resources among the available computation resources for generating the feature maps such that the feature maps are generated at regular time intervals, wherein the feature maps are generated with a predetermined delay after pictures corresponding to the feature maps are decoded such that the feature maps are generated at a same rate at which the pictures corresponding to the feature maps are decoded, and only one feature map is generated in each time interval of the regular time intervals, and wherein runtime for generating a reference feature map of the reference picture is different from runtime for generating a predicted feature map of the predicted picture.

14. The computer readable medium of claim 13, wherein in allocating, based on the runtime, the one or more computation resources among the available computation resources for generating the feature maps, the set of instructions that are executable by at least one processor of the computing device to cause the computing device to further perform:

allocating one or more computation resources such that a ratio of first computation power per unit time to be used for generating the reference feature map of the reference picture to second computation power per unit time to be used for generating the predicted feature map of the predicted picture corresponds to a ratio of first runtime for generating the reference feature map to second runtime for generating the predicted feature map.

15. The computer readable medium of claim 13, wherein in allocating, based on the runtime, the one or more computation resources among the available computation resources for generating the feature maps, the set of instructions that are executable by at least one processor of the computing device to cause the computing device to further perform:

allocating a first group of computation resources for generating the reference feature map of the reference picture and a second group of computation resources for generating the predicted feature map of the predicted picture.

16. The computer readable medium of claim 13, wherein in allocating, based on the runtime, the one or more computation resources among the available computation resources for generating the feature maps, the set of instructions that are executable by at least one processor of the computing device to cause the computing device to further perform:

allocating one or more computation resources among the available computation resources for generating the feature maps such that the feature maps are generated at a rate at which pictures corresponding to the feature maps are decoded.

17. The computer readable medium of claim 13, wherein the reference picture is an intra coded picture (I-picture) and the reference feature map of the reference picture is generated based on a decompressed reference picture.

18. The computer readable medium of claim 13, wherein the predicted picture is a predicted picture (P-picture) comprising motion information of the predicted picture with respect to the reference picture, and the predicted feature map of the predicted picture is generated from the reference feature map of the reference picture by propagation based on the motion information.

19. A terminal, comprising:

an accelerator comprising computation resources; and an apparatus for scheduling the computation resources for generating feature maps for video, comprising:

at least one processor configured to execute a set of instructions to cause the apparatus to perform:

determining runtime for generating feature maps of a reference picture and a predicted picture;

determining available computation resources for generating the feature maps; and allocating, based on the runtime, one or more computation resources among the available computation resources for generating the feature maps such that the feature maps are generated at regular time intervals, wherein the feature maps are generated with a predetermined delay after pictures corresponding to the feature maps are decoded such that the feature maps are generated at a same rate at which the pictures corresponding to the feature maps are decoded, and only one feature map is generated in each time interval of the regular time intervals, and wherein runtime for generating a reference feature map of the reference picture is different from runtime for generating a predicted feature map of the predicted picture.

\* \* \* \* \*